US009304599B2

United States Patent
Walline et al.

(10) Patent No.: US 9,304,599 B2
(45) Date of Patent: Apr. 5, 2016

(54) GESTURE CONTROLLED ADAPTIVE PROJECTED INFORMATION HANDLING SYSTEM INPUT AND OUTPUT DEVICES

(71) Applicant: Dell Products L.P., Round Rock, TX (US)

(72) Inventors: Erin K. Walline, Pfugerville, TX (US); Karthikeyan Krishnakumar, Round Rock, TX (US); Mark R. Ligameri, Lakeway, TX (US); Rocco Ancona, Austin, TX (US); Michiel Sebastiaan Emanuel Petrus Knoppert, Amsterdam (NL)

(73) Assignee: DELL PRODUCTS L.P., Round Rock, TX (US)

( * ) Notice: Subject to any disclaimer, the term of this patent is extended or adjusted under 35 U.S.C. 154(b) by 48 days.

(21) Appl. No.: 14/221,928

(22) Filed: Mar. 21, 2014

(65) Prior Publication Data

US 2015/0268730 A1 Sep. 24, 2015

(51) Int. Cl.
 *G06F 3/01* (2006.01)
 *G06F 3/0488* (2013.01)
(52) U.S. Cl.
 CPC ............ *G06F 3/017* (2013.01); *G06F 3/04883* (2013.01); *G06F 3/04886* (2013.01)
(58) Field of Classification Search
 None
 See application file for complete search history.

(56) References Cited

U.S. PATENT DOCUMENTS

| | | | |
|---|---|---|---|
| 6,134,661 A | 10/2000 | Topp | |
| 7,252,394 B1 | 8/2007 | Fu | |
| 7,692,667 B2 | 4/2010 | Nguyen et al. | |
| 8,228,315 B1 | 7/2012 | Starner et al. | |
| 8,321,810 B2 | 11/2012 | Henitze | |
| 8,509,986 B1 * | 8/2013 | Chen | 701/31.4 |
| 8,531,352 B2 | 9/2013 | Zeng et al. | |
| 2003/0132921 A1 | 7/2003 | Torunoglu et al. | |
| 2005/0141752 A1 * | 6/2005 | Bjorgan et al. | 382/103 |
| 2005/0225538 A1 | 10/2005 | Verhaegh | |
| 2005/0264987 A1 | 12/2005 | Krancher et al. | |
| 2006/0139714 A1 | 6/2006 | Gruhlke et al. | |
| 2006/0244719 A1 | 11/2006 | Brigham et al. | |
| 2007/0035521 A1 | 2/2007 | Jui et al. | |
| 2009/0168027 A1 | 7/2009 | Dunn et al. | |
| 2009/0278871 A1 | 11/2009 | Lewis et al. | |
| 2010/0328200 A1 | 12/2010 | Yu et al. | |

(Continued)

OTHER PUBLICATIONS

Celluon, Magic Cube, printed Aug. 24, 2015 http://www.celluon.com/products_epic_overview.php.

(Continued)

*Primary Examiner* — Joseph Haley
(74) *Attorney, Agent, or Firm* — Terrile, Cannatti, Chambers & Holland, LLP; Robert W. Holland

(57) ABSTRACT

Projected input and output devices adapt to a desktop environment by sensing objects at the desktop environment and altering projected light in response to the sensed objects. For instance, projection of input and output devices is altered to limit illumination against and end user's hands or other objects disposed at a projection surface. End user hand positions and motions are detected to provide gesture support for adapting a projection work space, and configurations of projected devices are stored so that an end user can rapidly recreate a projected desktop. A projector scan adjusts to limit traces across inactive portions of the display surface and to increase traces at predetermined areas, such as video windows.

8 Claims, 22 Drawing Sheets

(56) References Cited

U.S. PATENT DOCUMENTS

| | | | |
|---|---|---|---|
| 2011/0012727 A1 | 1/2011 | Pance et al. | |
| 2012/0050314 A1 | 3/2012 | Wang | |
| 2012/0176311 A1 | 7/2012 | Bittenson et al. | |
| 2012/0235909 A1 | 9/2012 | Birkenbach et al. | |
| 2012/0306767 A1* | 12/2012 | Campbell | 345/173 |
| 2012/0313858 A1* | 12/2012 | Park et al. | 345/171 |
| 2013/0111391 A1 | 5/2013 | Penner et al. | |
| 2014/0168083 A1* | 6/2014 | Ellard | 345/168 |
| 2014/0191927 A1* | 7/2014 | Cho | 345/8 |

OTHER PUBLICATIONS

Ubi, Sensor, printed Aug. 24, 2015 http://www.ubi-interactive.com/product/#UbiSensor.
Ibar, Intelligent Surface System, printed Aug. 24, 2015 http://www.i-bar.ch/.
Sun Innovations, Expanded Heads-Up Display (E-HUD), printed Aug. 24, 2015 http://www.sun-innovations.com/index.php/products/fw-hud.
Chris Harrison, OmniTouch: Wearable Multitouch Interaction Everywhere, Oct. 2011 http://chrisharrison.net/projects/omnitouch/omnitouch.pdf.
Leap Motion, Mac & PC Motion Controller for Games, Design, Virtual Reality & More, printed Aug. 24, 2015 https://www.leapmotion.com/.
razerzone.com, Razer Blade Pro, printed Aug. 24, 2015 http://www.razerzone.com/gaming-systems/razer-blade-pro.
Matt Smith, Alienware M17X R4 Review, Jun. 21, 2012 http://www.digitaltrends.com/laptop-reviews/alienware-m17x-r4-review/.
Joanna Stern, Intel Nikiski Laptop Prototype with See-Through Touchpad Hands-On Pictures and Video, Jan. 9, 2012 http://www.theverge.com/2012/1/9/2694171/Intel-Nikiski-hands-on-pictures-video.
Indiegogo, E-inkey Dynamic Keyboard, printed Sep. 9, 2015 http://www.indiegogo.com/projects/e-inkey-dynamic-keyboard.

* cited by examiner

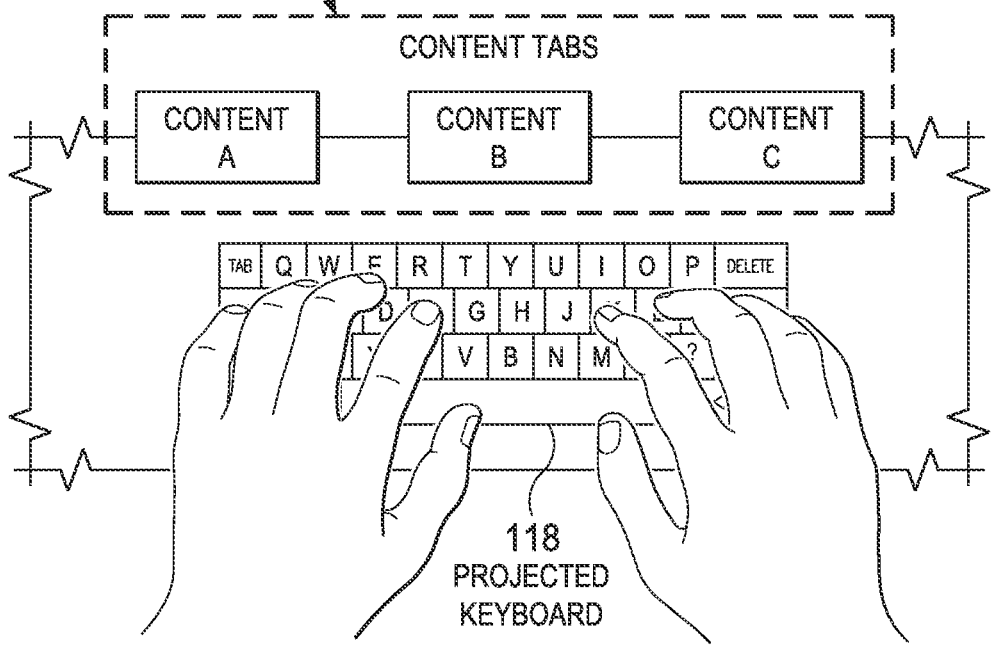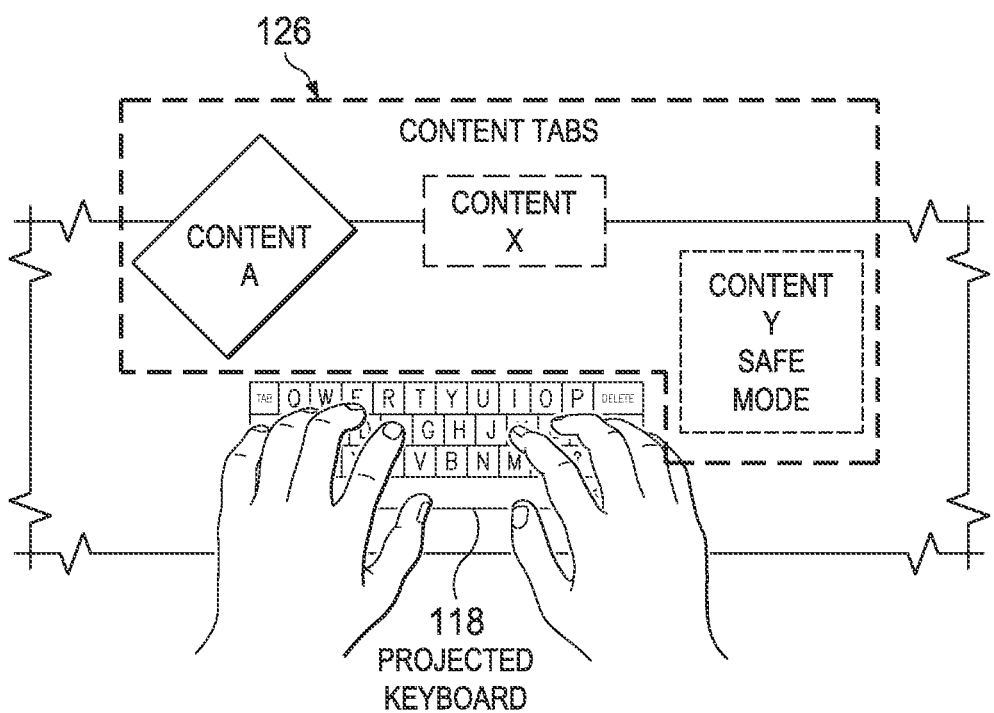
FIG. 6

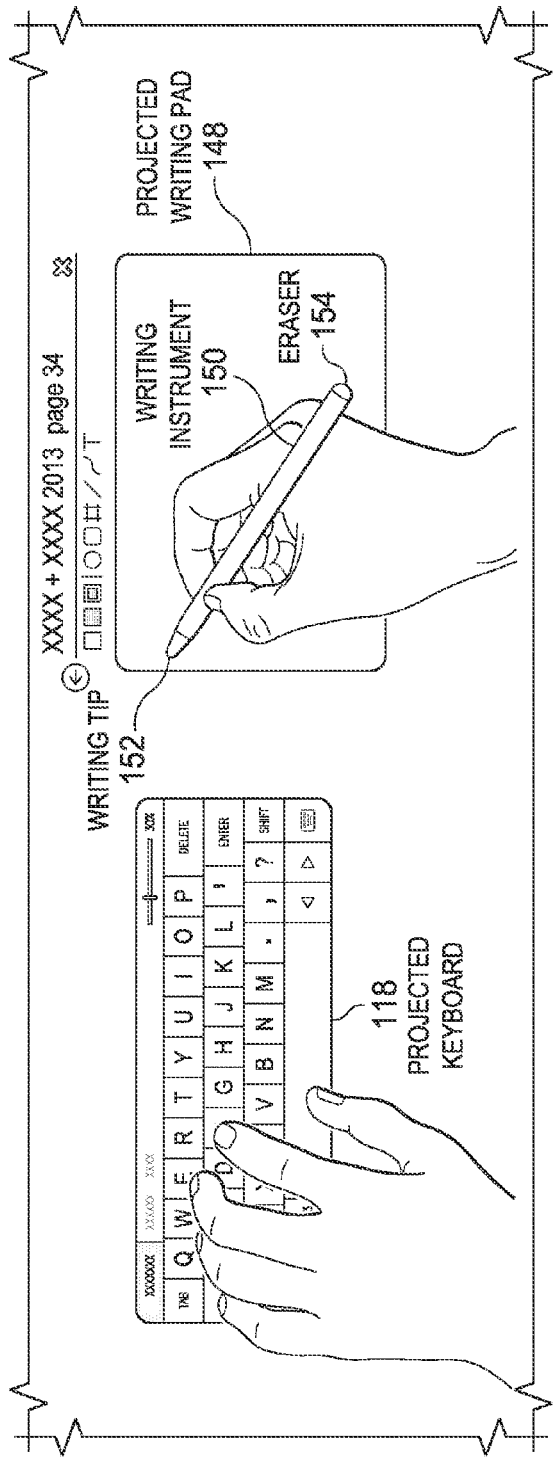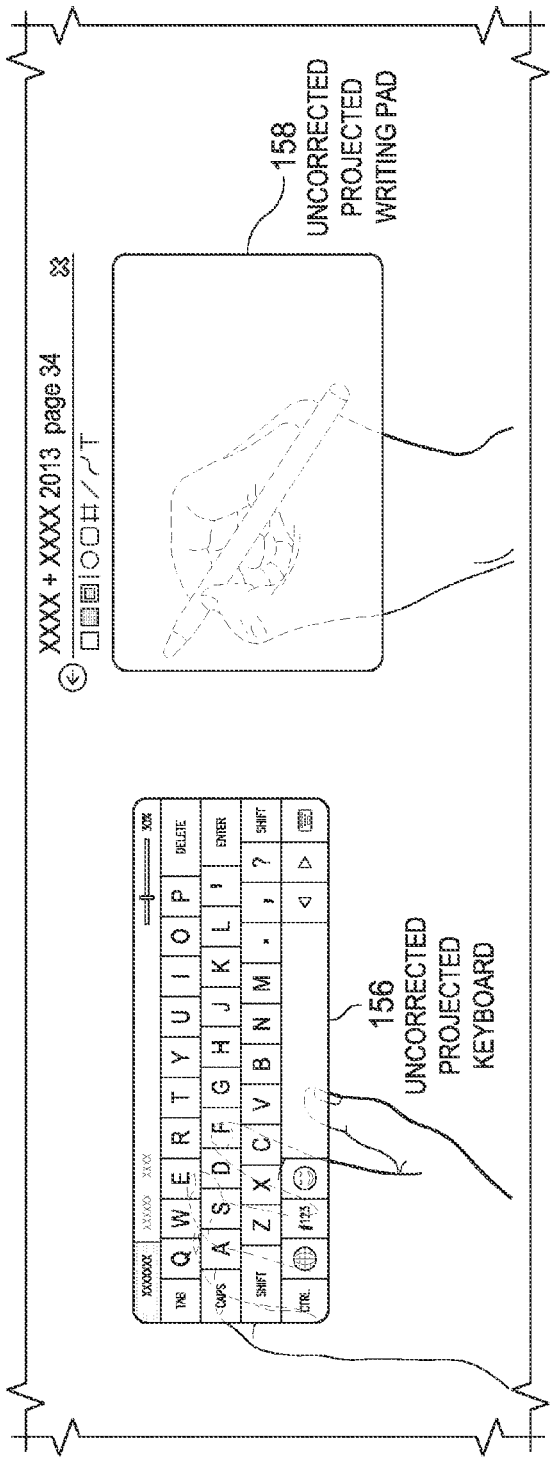
FIG. 9

FIG. 13
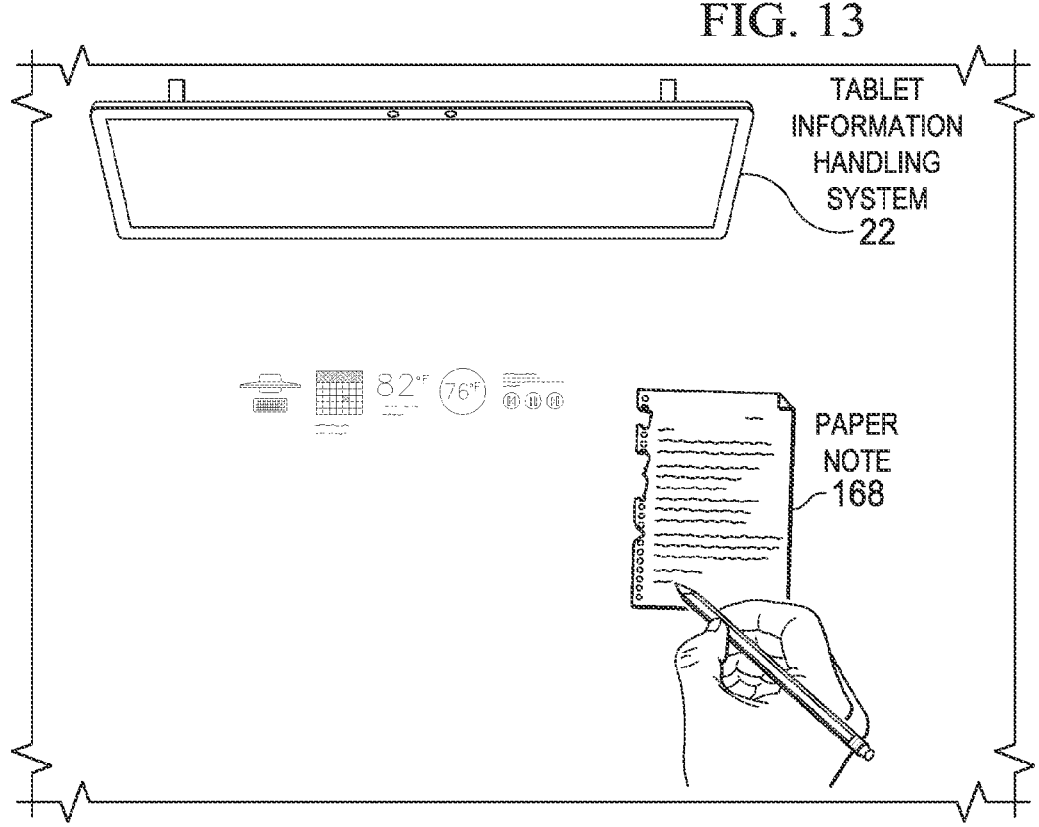
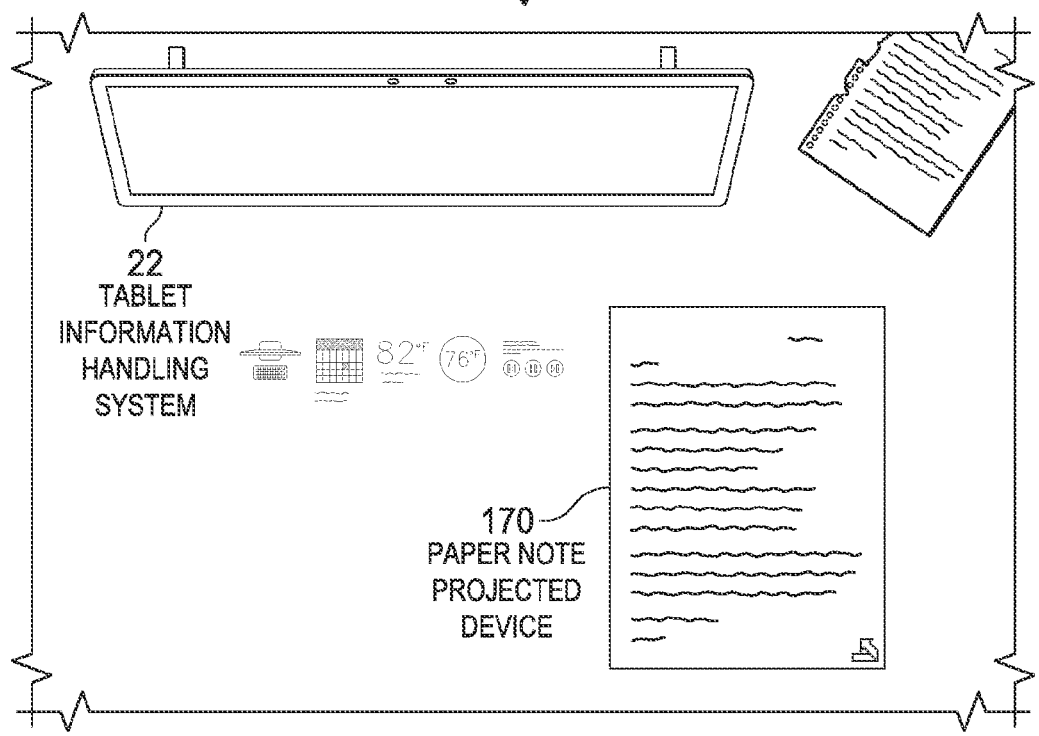

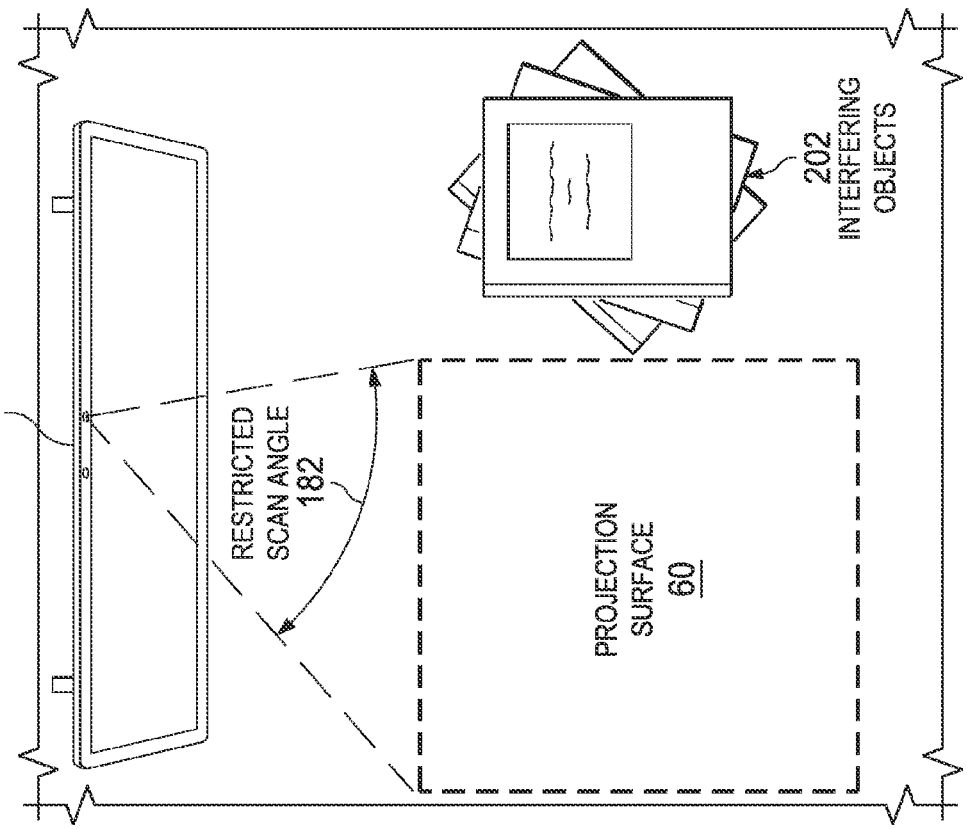
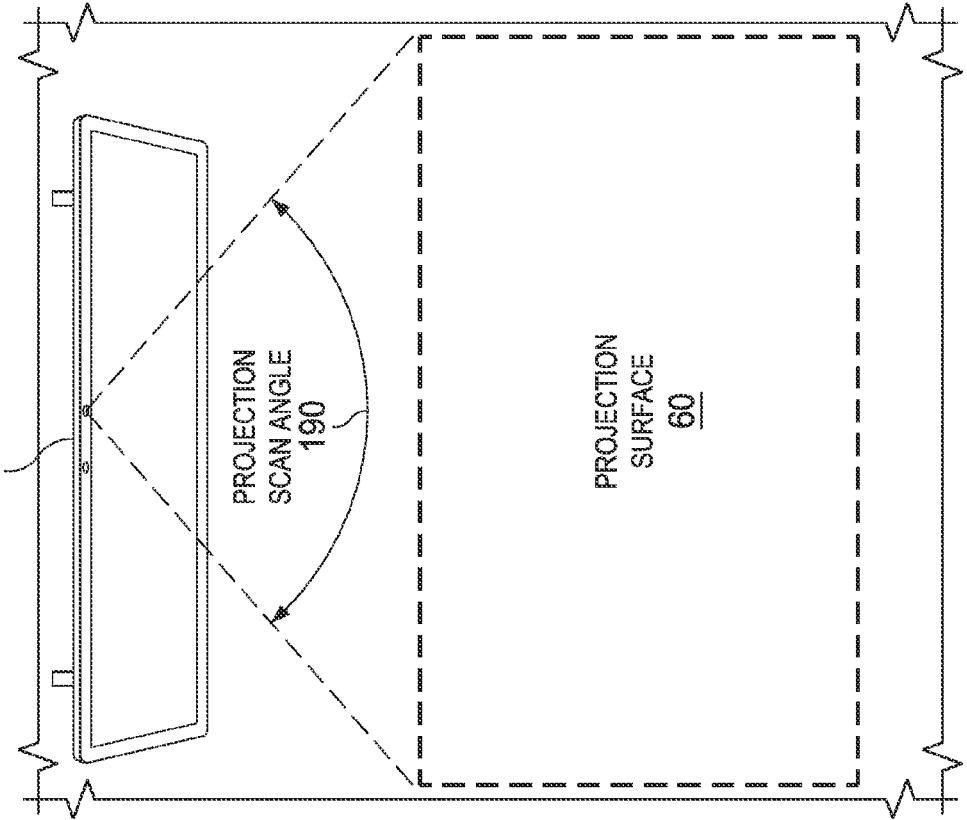
FIG. 19

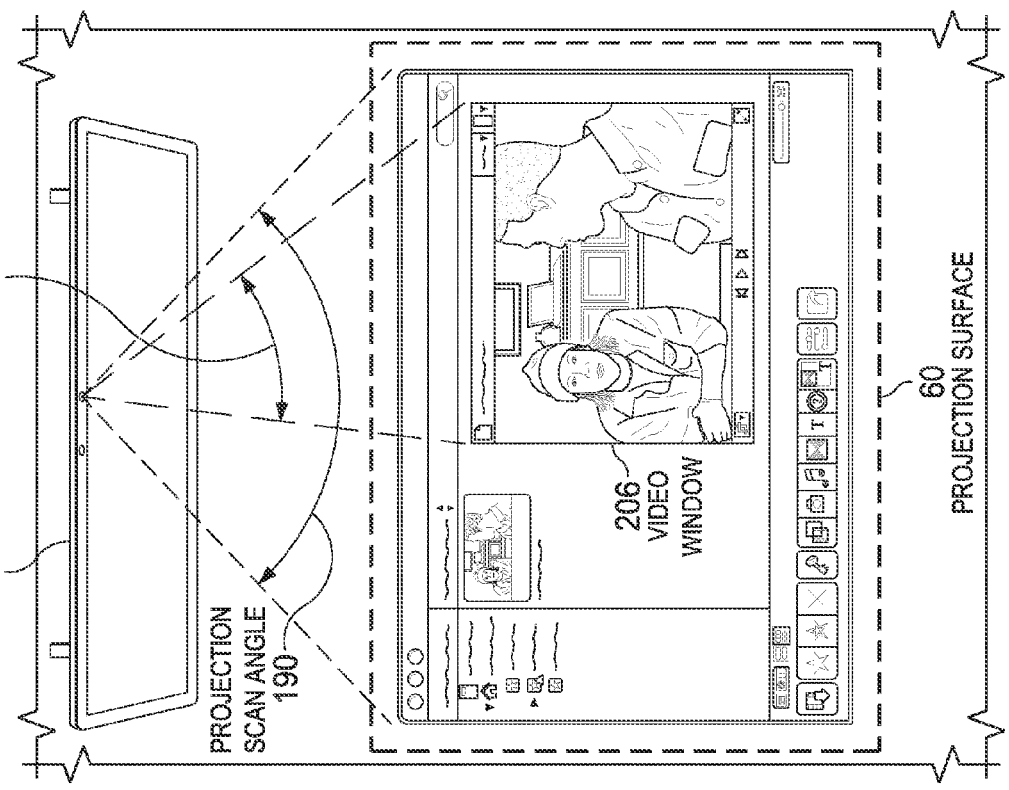
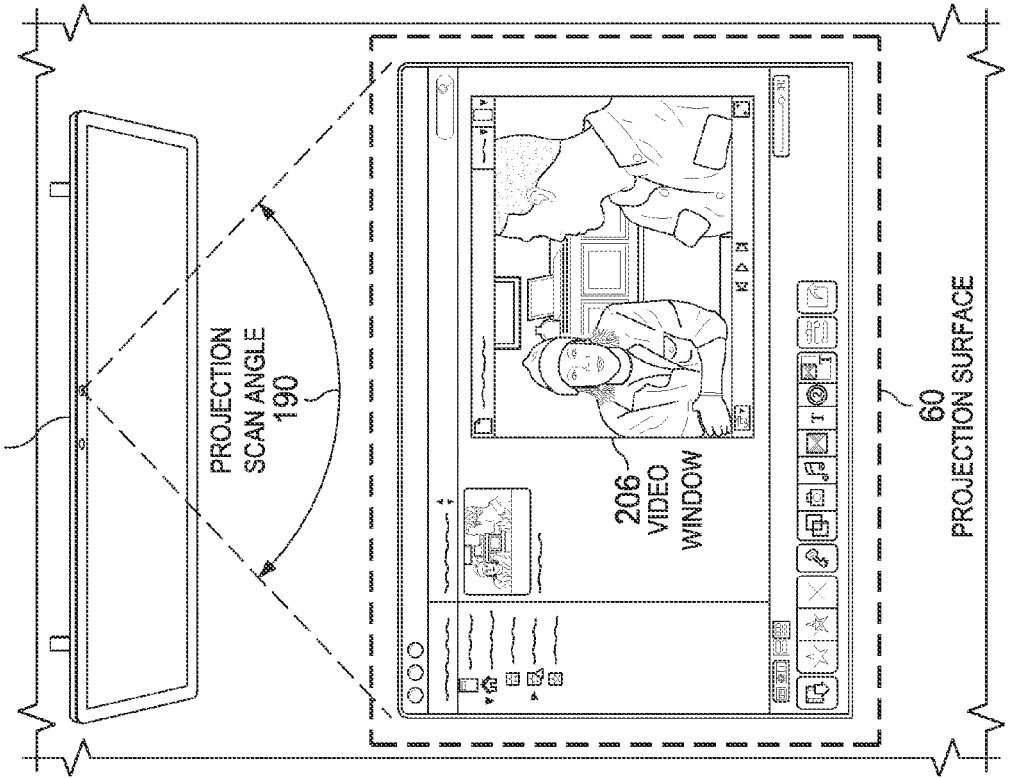
FIG. 21

GESTURE CONTROLLED ADAPTIVE PROJECTED INFORMATION HANDLING SYSTEM INPUT AND OUTPUT DEVICES

CROSS-REFERENCE TO RELATED APPLICATIONS

U.S. patent application Ser. No. 14/221,654, entitled "Projected Information Handling System Input Interface with Dynamic Adjustment" by inventors Abu Shaher Sanaullah, Karthikeyan Krishnakumar, Mark R. Ligameri, Rocco Ancona, and Michiel Sebastiaan Emanuel Petrus Knoppert, filed on Mar. 21, 2014, describes exemplary methods and systems and is incorporated by reference in its entirety.

U.S. patent application Ser. No. 14/221,878, entitled "Projected Information Handling System Input Environment with Object Initiated Responses" by inventors Abu Shaher Sanaullah, Erin K. Walline, Karthikeyan Krishnakumar, Mark R. Ligameri, Rocco Ancona, Michiel Sebastiaan Emanuel Petrus Knoppert, Roman J. Pacheco, and Christophe Daguet, filed on Mar. 21, 2014, describes exemplary methods and systems and is incorporated by reference in its entirety.

U.S. patent application Ser. No. 14/221,912, entitled "Context Adaptable Projected Information Handling System Input Environment" by inventors Erin K. Walline, Karthikeyan Krishnakumar, Mark R. Ligameri, Rocco Ancona, and Michiel Sebastiaan Emanuel Petrus Knoppert, filed on Mar. 21, 2014, describes exemplary methods and systems and is incorporated by reference in its entirety.

U.S. patent application Ser. No. 14/221,942, entitled "Interactive Projected Information Handling System Support Input and Output Devices" by inventors Abu Shaher Sanaullah, Erin K. Walline, Karthikeyan Krishnakumar, Mark R. Ligameri, Rocco Ancona, Michiel Sebastiaan Emanuel Petrus Knoppert, and Christophe Daguet, filed on Mar. 21, 2014, describes exemplary methods and systems and is incorporated by reference in its entirety.

U.S. patent application Ser. No. 14/221,967, entitled "Adaptive Projected Information Handling System Output Devices" by inventors Erin K. Walline, Karthikeyan Krishnakumar, Mark R. Ligameri, Rocco Ancona, Michiel Sebastiaan Emanuel Petrus Knoppert, and William Dale Todd Nix, filed on Mar. 21, 2014, describes exemplary methods and systems and is incorporated by reference in its entirety.

BACKGROUND OF THE INVENTION

1. Field of the Invention

The present invention relates in general to the field of information handling system input interfaces, and more particularly to a projected information handling system input interface with dynamic adjustment.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have evolved over time to fit increasingly powerful processing components into smaller and more portable housings. To support portability, information handling systems typically include internal battery power sources and integrated input devices, such as touchscreen displays that present input devices as images. End users have adapted to touchscreen input devices, such as touchscreen keyboards, however, using touchscreen input devices on a small display is often difficult and unnatural for end users. One difficulty is that small screens tend to have small keyboards with small keys that are difficult to accurately select. Another difficulty is that using a touchscreen keyboard consumes a portion of the display, thus making it more difficult to view content. Due to these difficulties, end users often interface portable information handling systems with peripheral devices, such as peripheral keyboards, mice and displays. Often, end user work stations include a docking station that aids an end user in establishing interactions with peripheral devices.

Although peripheral devices aid end user interactions with portable information handling systems, peripheral devices often have limited portability and, when portable, increase the size and weight that an end user must carry to use a portable information handling system. One solution that provides peripheral interfaces without substantially increased size is to integrate a projector and input sensor with a portable information handling system to project input and output devices. For example, pico projectors are relatively small MEMS laser-based devices that project images by scanning a point light source across a projection surface. A pico projector integrated in a portable information handling system projects an input device, such a keyboard, that an end user touches to make inputs to the portable information handling system. The end user's fingers are monitored with an input sensor, such as a depth camera, to capture inputs at the keyboard when the end user touches keys. Although projected keyboards provide a more natural typing position than an end user typically experiences with a touchscreen keyboard, end user interactions are nonetheless often strained by limitations in the appearance and reaction of projected input devices. Typically the projected input device has a canned response at a defined location that supports little if any other end user interactions or any other devices or objects located on a projection surface.

SUMMARY OF THE INVENTION

Therefore a need has arisen for a system and method which supports presentation of projected input and output devices in association with an information handling system in a natural and user-friendly manner.

In accordance with the present invention, a system and method are provided which substantially reduce the disadvantages and problems associated with previous methods and systems for presenting projected input and output devices in association with an information handling system. A desktop projection environment is supported that automatically detects, recognizes and responds to projection surface conditions so that an end user interacts with projected input and output devices in a natural and user-friendly manner.

More specifically, an information handling system processes information with components disposed in a housing for presentation as visual images at an output device. The information handling system includes projected device instructions that present output devices and input devices as projected devices with a projector. An input sensor, such as a depth camera, detects end user inputs at projected devices, such as touches at keys of a projected keyboard. Gestures by end user hands detected by an input sensor adjust the configuration of projected input and output devices, such as the size, location, orientation and type of devices. The input sensor also detects objects proximate to a projection surface so that projected devices adapt responsive to the objects. For example, a projector restricts projection of light so that projected devices are not disposed over objects, such as an end user's hands or a book on the projection surface. As another example, a projector automatically projects or removes predetermined projected devices based upon an identification of an object on a projections surface. For instance, detection of a smartphone information handling system in a first predetermined orientation automatically results in a projected keyboard for interactions with the smartphone information handling system, while a second predetermined orientation automatically results in synchronization with another information handling system and display of files transferred by the synchronization, such as pictures. Storage of projected device configurations locally and at network locations allows an end user to recreate a projected desktop in a rapid manner at distal locations and across diverse information handling systems. As another example, detection of a certain hand anthropometry could suggest a specific set of content or keyboard layout/size/orientation to be projected onto the projected workspace. In another example embodiment, projection of input and output devices on or around "totem" objects integrated customized objects created to or associated with recognition by an input sensor to enhance user interactions, such as dumb keyboards that provide tactile feedback to an end user while the input sensor determines actual inputs based on a detected keyboard position, volume control knobs that user manipulates so that an input sensor detects a selected volume, and a dumb mouse that a user manipulates so that an input sensor moves a cursor based on visual detection by the input sensor of the mouse position.

The present invention provides a number of important technical advantages. One example of an important technical advantage is that a desktop projection environment is provided to automatically adjust projected input and output devices to adapt to conditions at a projection surface. An end user interacts with projected input and output devices by gesturing to establish a desired configuration of input and output devices for desired tasks. The configurations are stored locally and/or at network storage to provide an end user with tools to quickly re-create a projected environment at different locations. The projected input devices automatically interact with the desktop environment to provide user-friendly and adaptable tools. For example, automated detection of objects at a projection surface initiates adaptations of projected devices responsive to the objects, such as by presenting input and output devices to interact with information handling systems disposed on a projection surface, automatically establishing network interfaces and data transfer based upon an identification of an information handling system disposed on a projection surface, and modifying a response to an object based upon features of the object, such the objects orientation, color, logos, location and operating state. Projected devices adapt automatically to objects by adjusting a projector scan to avoid projection on the object. For instance, an end user's hand position detected by an input sensor is provided to a projector to limit or eliminate projection on the end user's hands. Adapting projected devices responsive to objects sensed at or near a projection surface enhances an end user's experience by providing projected devices that interact and appear more like physical devices. Further, projected devices become interactive tools that aid and guide an end user's physical interactions with an information handling system, such as by directing an end user to physical components of the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 6 depicts an example embodiment of physical anthropometry to adapt projected devices to an identified end user;

FIG. 9 depicts an example embodiment of adaption of projected devices in response to detection of an end user's hand intervening between a projector and a projection surface;

FIG. 13 depicts an example embodiment of capture of a physical desktop element into a virtual workspace;

FIG. 19 depicts an example embodiment of adjusted scan angle use at a projected desktop to avoid projection of devices onto objects;

FIG. 21 depicts an example embodiment of adjusted scan angle use at a projected desktop to enhance illumination at moving images;

DETAILED DESCRIPTION

Information handling systems interact with end users through adaptive projected input and output devices to improve the end user experience. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (1/O) devices, such as a keyboard, a mouse, and a video display. The information handling system may also include one or more buses operable to transmit communications between the various hardware components.

Figure 1:
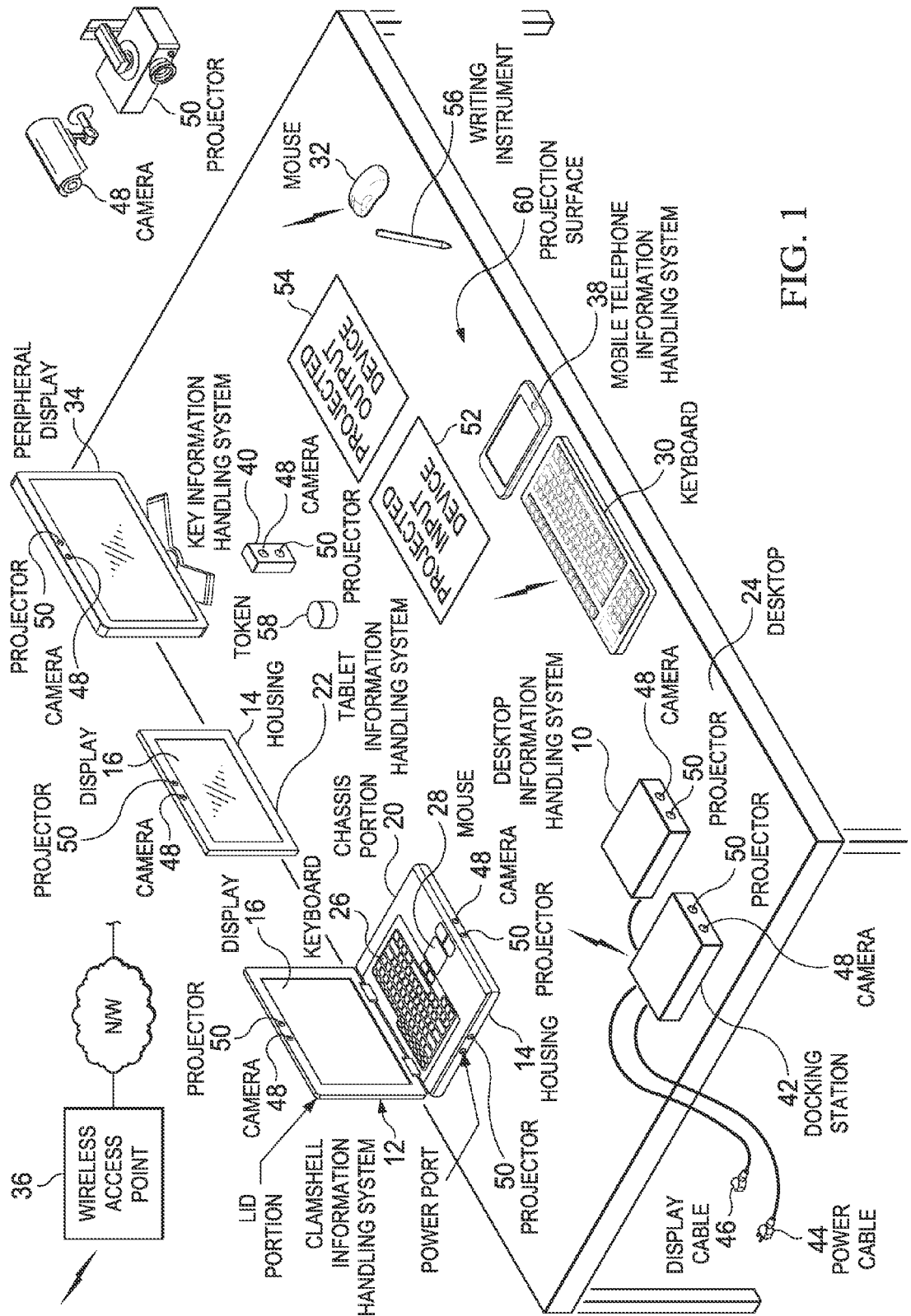
FIG. 1 depicts an example embodiment of plural information handling systems deployed in a desktop environment and supported by projected input and output devices.

Referring now to FIG. 1, an example embodiment depicts plural information handling systems deployed in a desktop environment and supported by projected input and output devices. In the example depiction, the information handling systems include a desktop information handling system 10 designed to operate in a stationary location, and several types of portable information handling systems: A clamshell-housing information handling system 12 has a housing 14 with a display 16 disposed in a lid portion 18 that is rotationally coupled to chassis portion 20 to rotate between open and closed positions. A tablet information handling system 22 has a display 16 disposed in a generally planar housing 14 that rests flat on desktop 24 or, as is depicted, rests upright in a support stand. An information handling system with a clamshell configuration generally includes an integrated keyboard 26 and mousepad 28 to accept end user inputs, and also may include a touchscreen in display 16 to accept end user inputs as touches at display 16. An information handling system with a tablet configuration typically does not integrate a keyboard or mousepad, but does include a touchscreen to accept end user inputs as touches. Desktop, clamshell and tablet information handling systems each generally provide support for end user inputs through peripheral devices, such as physically-separate peripheral keyboards 30, mice 32 and displays 34 that may include a touchscreen. For instance, peripheral input and output devices communicate wirelessly with information handling systems using Bluetooth, wireless personal area networks (WPANs), such as 802.11ad, wireless local area networks (WLANs) coordinated through a wireless access point (WAP) 36, such as 802.11n, as well as through conventional wired interfaces, such as Ethernet, Universal Serial Bus (USB), and DisplayPort.

In addition to clamshell and tablet information handling systems, other types of portable information handling systems depicted by FIG. 1 include a mobile telephone information handling system 38, often referred to as a smartphone, and a key information handling system 40. Mobile telephone information handling system 38 is generally similar in configuration to a tablet information handling system but sized as a telephone handset and including wireless wide area network (WWAN) communications to support telephone interfaces. Key information handling system 40 includes processing and memory in a portable housing to store and execute applications like conventional information handling systems but does not include integrated physical input/output (I/O) devices, such as a physical keyboard, mouse, touchpad or liquid crystal display (LCD). Key information handling system 40 relies upon wireless communication with I/O devices, such as displays and keyboards, or projection of input and output devices as set forth herein. Although the portable information handling systems may run as independent systems, in the environment of desktop 24, interaction between all information handling systems and desktop resources may be coordinated by an application executing on one or more information handling systems or by an application executing on processing resources within a docking station 24. For example, docking station 24 provides a power cable 44 and display cable 46 to physically interface power and display peripheral resources with an information handling system. Docking station 42 may also coordinate wireless resources, such as by assigning peripheral communication tasks between information handling systems and peripherals through WLAN and WPAN resources.

In the example environment provided by the resources of desktop 24, additional input and output devices are supported with cooperation between projector devices and depth camera devices or other types of input sensors. In the example embodiment one or more cameras 48 and one or more projectors 50 are integrated in each of the information handling systems. In addition, independent cameras 48 and projectors 50 are deployed in raised and other locations that provide access to the desktop 24. Processing components disposed in the various information handling systems access and use available camera 48 and projector 50 resources to generate projected input devices 52 and projected output devices 54. Generally, projected input devices 52 are images generated by one or more projectors 50 that provide indications for an end user to touch in order to make an input. Inputs at an input device 50 are detected by one or more cameras 48 or other type of input sensor. As an example, projectors 50 project images of keyboard keys with visible light and provide depth references with light that is not visible to the human eye, such as infrared light. Cameras 48 act as depth cameras that determine inputs when end user fingers touch an area where a key is illuminated. Generally, projected output devices 52 are images generated by one or more projectors 50 that present visual information generated by an information handling system, such as a projector display. Although some projected input devices only accept inputs and some projected output devices only present visual images, some projected input and output devices perform both input and output functions. For instance, in one embodiment, a projected keyboard includes an output device that presents key values as the values are typed. As another example, a projected display output device accepts touches in a manner similar to that of a touchscreen LCD device.

The types of projected input devices 52 and projected output devices 54 are selectable manually by an end user or automatically configured based upon context detected at the desktop 24 by cameras 48 or other input sensors. As an example, the presence of a writing instrument 56, such as pencil or pen, detected by an input sensor as held by an end user in a writing position automatically generates a writing pad input/output device. As an end user writes with writing instrument 56 on the writing pad, the writing motions are detected by cameras 48 and the writing is presented as output on the writing pad. As another example, a totem 58 is recognized by a camera 48 and projected input devices 52 and projected output devices 54 associated with the token are automatically presented. Other types of contextual information at desktop 24 may be applied to present appropriate projected input and output devices as set forth in greater detail below. As another example, inputs made by an end user at a keyboard 30 and detected by an information handling system may be applied to reduce the amount of a projection surface 60 consumed by projected input and output devices. For instance, an end user's interaction with a physical peripheral keyboard 30 indicates that a projected keyboard may be minimized so that addition projection surface 60 area is available for presenting projected output devices. As another example, an end user of a key information handling system 40 uses an integrated camera 48 and projector 50 on a projection surface 60 during independent operations to project input and output devices, however, when within wireless resources of desktop 24 managed by docking station 42, the integrated projection and camera have their capabilities effectively expanded through coordinated interactions with desktop 24 cameras 48 and projectors 50 as set forth below.

Figure 2:
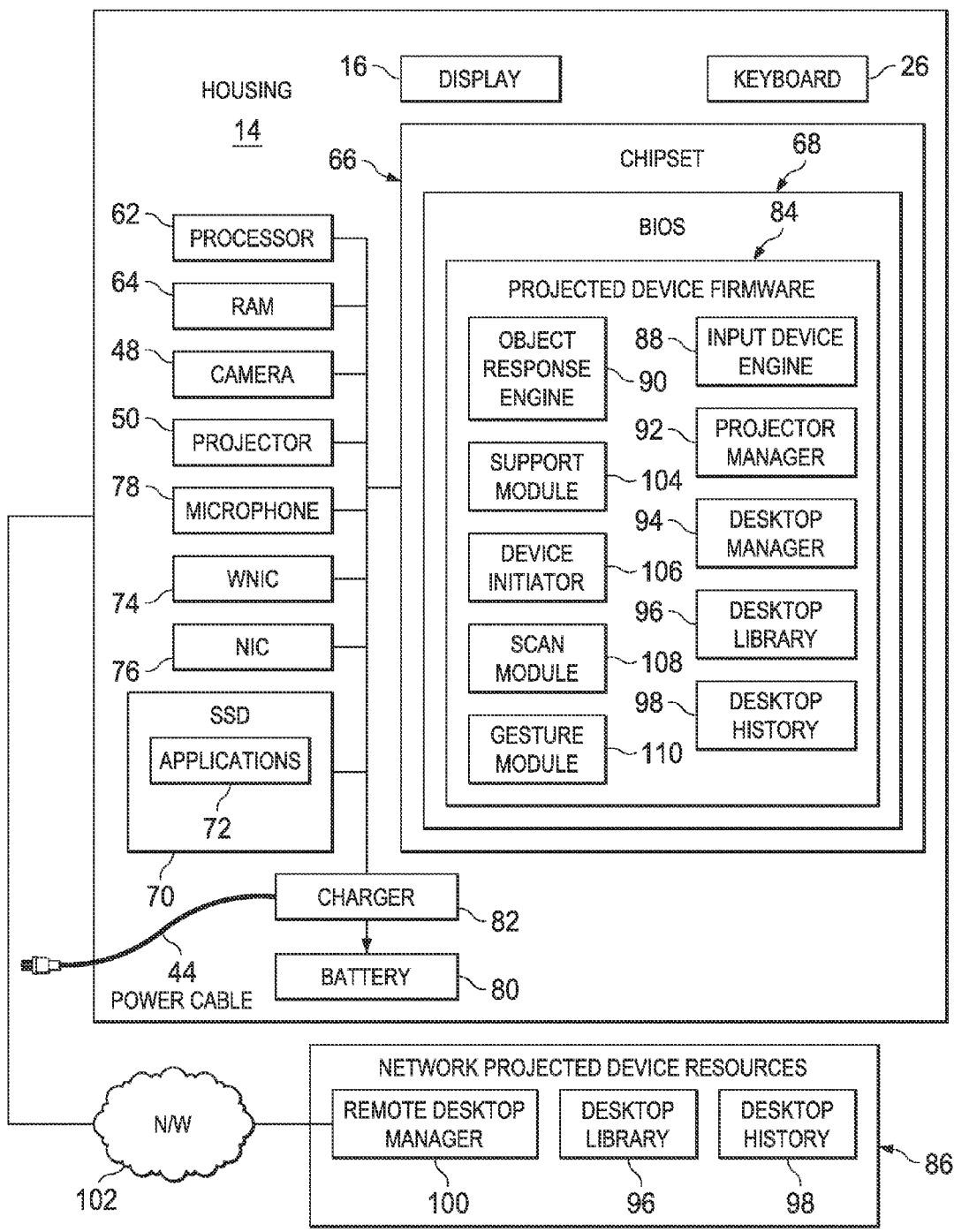
FIG. 2 depicts a block diagram of an information handling system having projected input and output devices.

Referring now to FIG. 2, a block diagram depicts an information handling system 10 having projected input and output devices. Although the example embodiment depicts a display 16 and keyboard 26 integrated into housing 14, alternative embodiments may have alternative configurations, such as those generally described with respect to FIG. 1. Information handling system 10 includes a processor 62, such as a central processing unit (CPU) manufactured by INTEL or ARM that executes instructions to process information under management of an operating system, such as WINDOWS manufactured by MICROSOFT or ANDROID manufactured by GOOGLE. Instructions and information being processed are stored in random access memory (RAM) 64, which communicates with processor 62 under the management of firmware executing on a chipset 66, such as a Basic Input/Output System (BIOS) 68 executing on a keyboard controller, memory controller or other processing component included in chipset 66. Persistent memory, such as a solid state drive (SSD) 70 or hard disk drive, stores information during power down, such as applications 72 that are called to execute on processor 62. In one embodiment, persistent memory, such as flash memory, provides a unified memory that also performs the function of RAM 64. A wireless network interface card (WNIC) 74 supports wireless communication with WWAN, WLAN and/or WPAN resources and a network interface card (NIC) 76 supports wired network interfaces, such as Ethernet. A camera 48 captures images proximate to housing 14 and acts as an input sensor to detect inputs made by an end user to projected I/O devices as set forth herein. For example, camera 48 is a depth camera that measures distances to images and objects proximate housing 14. In alternative embodiments, other types of cameras may be used, such as webcams that detect color information to provide detection of logos or text detection of written words. A projector 50 projects visual information as images at a projection surface proximate housing 14. Projector 50 is, for example, a Micro-Electro Mechanical System (MEMS) that scans a point light source, such as a laser, to generate projected images based upon the trace of the laser across the projection surface. A microphone 78 captures audible information for use by processor 62, such as with voice commands or for videoconferencing. A battery 80 supplies internal power to run the processing components disposed in housing 14. A charger 82 accepts power from an external power cable 44 to run the processing components and charge battery 80.

Coordination of processing components to perform projected input and output device functions is performed by projected device firmware 84 stored in chipset 66 flash memory, such as in part of BIOS 68. In alternative embodiments part or all of projected firmware device 84 may be distributed to alternative storage and processing resources of information handling system 10 or to storage and processing resources available from network communications, such as resources at other information handling systems or network projected device resources 86 deployed at a server. Projected device firmware 84 includes a variety of modules, engines and data files that processing components of information handling system 10 apply to create and interact with projected input and output devices.

An input device engine 88 executes on one or more of the processing components to generate input devices for presentation by projector 50 on a projection surface based on an end user request or automated response, such as detection of placement of a hand in a typing position to generate a projected keyboard or detection of a writing position with a writing instrument to generate a projected writing pad. Input device engine 88 analyzes the images captured by one or more cameras 48 or other input sensors and adjusts projected input devices to adapt to information determined from analyzing the captured image. For example, input device engine 88 determines the position of an end user's hand and adjusts projection of an input device so that the end user's hand is not illuminated by projector 50. In one embodiment, as an end user types on a projected keyboard, input device engine 88 determines the pixels that the projector 50 will project at the end user's hand and commands a black color for those pixels so that the hands are not illuminated, or halts illumination entirely at those pixels. Input device engine 88 may also recruit other projector resources that have different viewing angles of a projection surface to fill in shadows underneath an end user's hand, such as by projecting from a side view with a docking station projector. Input device engine 88 performs a similar function when other objects impede the line of sight between a projector 50 and a projection surface so that the object is not illuminated. For instance, an end user who writes on a projected writing pad will have blackened pixels projected at his hand and at the writing instrument held in his hand. As another example, if a writing instrument or paper pad rests on a projected writing pad or a projected keyboard, input device engine 88 continues to project the writing pad or keyboard around the object while projecting black pixels at the object.

An object response engine 90 executes on one or more processing components to analyze information sensed by an input sensor to detect an object proximate to a projection surface and provide a response upon detecting the object. In some instances, objects are stored in memory and associated with a response so than a response occurs automatically upon detection of the object. In other instances, discovered objects not recognized by object response engine 90 or not associated with a response can trigger a learning process to provide an association with the object upon future detection and a learned response. In one example embodiment, an Internet search may yield clues as to appropriate responses for a discovered object, and object response engine 90 suggests such actions for an end user. For instance, if a user buys a new phone not recognized by object response engine 90, when the new phone is detected as a new object, object response engine 90 searches safe Internet locations based on appearance, shape, logos, markings, etc. . . . of the phone to find that it a recognized make and model, and offers to the use to pair the phone and teach new features. In another example embodiment, object response engine 90 detects a portable information handling system placed within the field of projection of a projector 50 and, in response to the presence of the portable information handling system, establishes a wireless interface between the portable information handling system and the information handling system 10 managing the projector 50 of the projection field to perform automated functions. For instance, one automated function is to automatically initiate a data transfer, such as a smartphone synchronization of pictures, between the portable information handling system and the managing information handling system 10 if a display of the portable information handling system is oriented up, and to initiate a WiFi hotspot through the portable information handling system display is oriented down. Another example automated function is recognition by the input sensor of a logo on the portable information handling system or other form of identification, such as shape, size, color, etc. . . . , so that an application associated with the recognized feature is automatically initiated. Another example of an automated function is projection of input and output devices for the portable information handling system by the information handling system 10 managing the input sensor 48 and projector 50 so that the end user can interact with the portable information handling system through the input and output devices with communications coordinated by the managing information handling system 10. Other objects recognized by object response engine 90 include a writing portion and an erasing portion of a writing instrument so that an end user can write or erase at a projected writing pad based upon the orientation of the writing instrument. In another alternative embodiment, a totem object is placed in view of the input sensor to initiate projected input or output devices based upon recognition of the totem, writing on the totem, or user manipulation of the totem, such as turning, flipping, moving or otherwise adjusting the totem.

A projector manager 92 executes on one or more processing components to automatically command projection of selected of plural types of input devices and output devices based upon applications activated by an end user at information handling system 10. For instance, a projector manager 92 projects a default set of input and output devices when a new user interacts with information handling system 10, and then adapts the projected input and output devices based upon applications initiated by the end user. As an example, the default input device is a simple projected keyboard input device and a status bar that shows system status of information handling system 10, such as WiFi connection, battery charge, power source, etc. . . Once an end user initiates an application, projector manager 92 initiates projection of input and output devices associated with the application, such as a mouse pad, a number pad, a writing pad, and/or a display window with application information presented. In one embodiment, projector manager 92 automatically adapts projected input and output devices based upon a context sensed by input sensor, such as by turning on a projected writing pad for use with a word processing application each time an end user picks up a writing instrument and turning off the projected writing pad when the end user puts down the writing instrument.

A desktop manager 94 works in cooperation with projector manager 92 to adapt projected input and output devices to specific end users and for specific situations. Desktop manager 94 saves projected input and output device configurations in memory, such as in a desktop library 96. Desktop library 96 stores projected input and output device configurations that are predefined for predetermined end users, hardware configurations and application configurations. Desktop manager 94 automatically stores manually-selected projected device configurations by an end user in desktop library 96 and automatically recreates the projected devices for the end user in response to predetermined conditions, such as selection by the end user of the same applications for execution at information handling system 10. A desktop history 98 is also managed by desktop manager 94 to store data populated by configurations defined in desktop library 96. For example, desktop manager 94 projects a desktop timeline of desktop configurations used by an end user and data from desktop history 98 so that an end user can select a desktop state for recreation. Network projected device resources 86 includes a remote desktop manager 100, a desktop library 96 and a desktop history 98 interfaced with information handling system 10 through a network 102 so that same functionality provided by a local desktop manager 94 is available from a network location. An end user, for instance, can sign onto any enterprise information handling system to automatically create a default projected desktop of projected input and output devices by accessing remote desktop manager 100 and looking up the end user by an identifier to retrieve the end user's default configuration from desktop library 96. The end user can pick up on a project by projecting a desktop timeline and selecting data to populate the projected input and output devices from desktop history 98.

A support module 104 executes on one or more processing components to aid end user interactions with physical devices disposed at an information handling system 10, including interactions with physical and projected input and output devices. Support module 104 projects images that direct end user interactions with physical components, such as by projecting arrows that point to physical components of interest to an end user. As an example, support module 104 projects a battery charge status icon next to the location of a charging port of information handling system 10. When the battery charge reaches a predetermined level, support module 104 projects an arrow to show the location of the charging port and/or, if the charging cable is detected by an input sensor, projects the arrow to show the location of the cable and the movement needed for the cable to insert in the charging port. Support module 104 projects other types of icons and initiates projected support functions based upon the physical component involved, such as wired and wireless networking resources, speaker, microphone and display peripheral resources, changes to physical components like changing a battery, etc. . . A device initiator 106 interfaced with support module 104 prepares processing components to interact with physical devices based upon projected indicators provided by support module 104. For example, if support module 104 responds to an end user request for support to indicate a location for a USB key to insert, device initiator 106 prepares information handling system 10 to interact with the USB key by loading an appropriate driver. Support module 104 detects that a particular port, wired connection and/or wireless connection is not available and indicates unavailability or incompatibility to the end user, such as with a projected output device. As another example, docking station interaction is prepared for the end user based upon an indication by support module 104 to an end user of the location of the docking station. In one embodiment, identification information relating to an external physical device is gathered by an input sensor so that device initiator prepares information handling system 10 to interact with the device before a wired or wireless interface is initiated by an end user in response to indicators provided by support module 104. Support module 104 takes advantage of the availability of multiple projectors in a desktop area to present support projections separately from other projected input and output devices. In one embodiment, a projector includes plural MEMS point light sources that illuminate through a common lens, as set forth in greater detail below, so that one MEMS point light source is diverted for support projections when needed. As an example, if an external physical device is password protected, one MEMS device projects a support interface that accepts a password input while the other MEMS device projects a support interface illustrating how an end user should interact with the physical device.

A scan module 108 executing on one or more processing components adjusts the scan of projectors 50 in response to one or more predetermined conditions so that a light source scan traces less than all of the projection surface that the projector 50 can illuminate. As one example, when object response engine 90 detects an object on a projection surface, scan module 108 modifies the scan traced by a projector to exclude a trace through the area that includes the object. Modifying the scan trace instead of projecting black pixels results in reduced power consumption and improved illumination at the projection surface where an image is projected, such as by increasing the rate of scan in the reduced scan area. For instance, if an input sensor, such as a depth camera 48, detects a book on a projection surface where a projected input or output device exists, then scan module 108 changes the scan traced by a projector laser MEMS device to exclude the area of the book and reduces the size of the input or output device to fit in the new scan trace. As another example, if an image projected on a projection surface, such as word processing document, has an idle portion, such as where the images does not consume the entire desktop projection capability, scan module 108 excludes the idle area from the projector scan so that only the word processing document itself is illuminated. In another embodiment, scan module 108 coordinates multiple projectors to cooperate in projecting images with different scan traces. For instance, a first projector MEMS device illuminates a desktop projection surface that includes a window having a video. Scan module 108 has a second MEMS device project within the video window to enhance the rate at which a point source traces the video image and thereby improve the video brightness by increasing the scan rate of the video. In another embodiment, an end user gestures a projection area within the available projection surface and scan module 108 generally limits the scan trace to the gestured window as adjusted to fit a defined aspect ratio. By adopting the defined aspect ratio and altering the projector point light source scan, scan module 108 avoids idle illumination, such as black pixels or light dumping, at portions of the desktop that lack content.

A gesture module 110 executes on one or more processing components to provide end user interaction with projected input and output devices by hand and/or finger motions detected by an input device, such as depth camera 48. Some examples of gestures detected by a input sensor to adjust projected input and output devices include: placing fingers in a typing position to align a keyboard with the fingers; dragging the fingers apart to project a split keyboard; rotating the fingers to rotate a projected device; pinching a projected device to increase or decrease its size; identifying features of a hand to project devices associated with the identified features; pressing down and dragging a projected device to move the projected device to a new location; lifting a projected device to raise presentation of the device against a vertical surface or provide a three dimensional presentation of the device; and touching a device to subdue presentation of the device. In one example embodiment, swiping a projected keyboard causes the language of the keyboard to change to a new language. One example projected keyboard provides a text window proximate the keys to show key inputs made by an end user as keys are touched to make inputs to an application presented in a projected output device. The text window allows hunt and peck users to monitor inputs for accuracy without having to look away from the keyboard. In one example embodiment, a swipe of the text window changes the language of the text window so the text window shows a language different from that input to an application.

Figure 3:
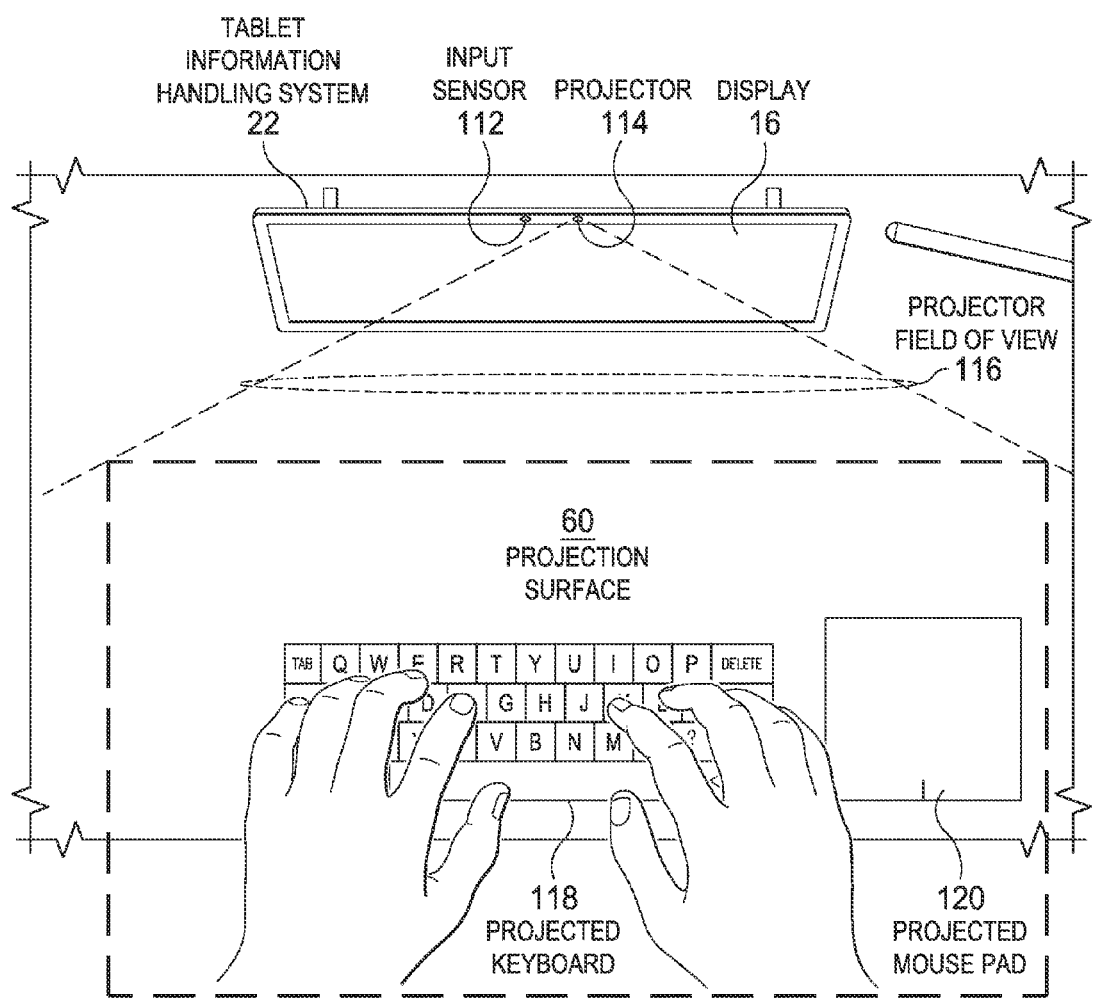
FIG. 3 depicts an example embodiment of a tablet information handling system automatically presenting projected input devices in response to an end user gesture.

Referring now to FIG. 3, an example embodiment depicts a tablet information handling system 22 automatically presenting projected input devices in response to an end user gesture. Tablet information handling system 22 is supported generally perpendicular to projection surface 60 so that an input sensor 112, such as a depth camera, and a projector 114, such as a point light source MEMS laser, are directed at projection surface 60. Projector 114 has a projector field of view 116 established by a maximum scan angle of the point light source within projector 114. Input sensor 112 captures images of the area associated with projection surface 60, such as images of objects within projector field of view 116. In the example depicted by FIG. 3, an end user has placed hands in a typing position. Input sensor 112 detects the hands and the typing position to allow projection by projector 114 of a projected keyboard 118 and a projected mouse pad 120. Projected keyboard 118 is automatically generated so that the "F" key aligns with the first finger of the left hand and the "J" key aligns with the first finger of the right hand. Projected keyboard 118 and projected mouse pad 120 accept inputs for interaction with applications presented by display 16 with the inputs detected by input sensor 112 and provided an input value based upon the location of the input compared with the projected device presented at the location.

In the example embodiment, tablet information handling system 22 executes logic as set forth in FIG. 2 to automatically detect, recognize and respond to the presence of an interaction between the end user and other physical objects within the input sensor 112 field of view. Objects that interact with a projected device environment include human features that perform identified gestures, totems that have identified meanings, peripheral computing devices and tools, personal property, and other things inserted into the projected device environment by an end user. The end user may manually train tablet information handling system 22 to adapt the projected devices to objects in the input sensor field of view or may rely on automated features, such as predefined gestures and objects. Alternatively other processing may take place, such as applying the presence of objects to cause a processing action to take place without impact to projected output, or, as set forth above, automated discovery of objects to may "learn" the proper response. For instance, in one example embodiment, placing fingers in a typing position will not initiate a keyboard unless the end user wiggles his fingers. In another embodiment, placing fingers in a typing position will initially cause a subdued keyboard to illuminate, which then transitions to full illumination upon a confirmation by the end user that a keyboard is desired, such as initiating typing.

Figure 4:
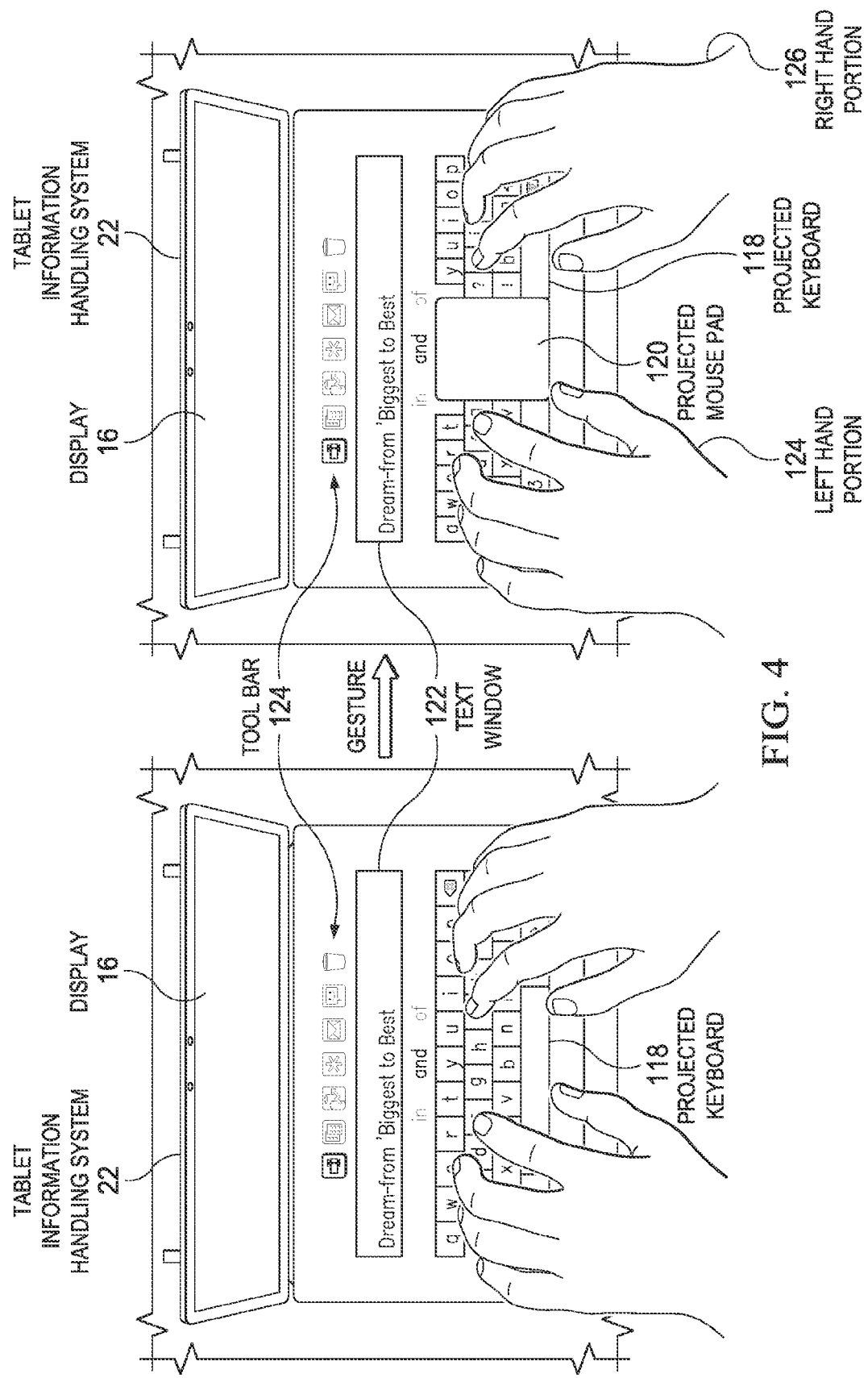
FIG. 4 depicts an example embodiment of a tablet information handling system automatically adapting projected input and output devices in response to an end user gesture.

Referring now to FIG. 4, an example embodiment depicts a tablet information handling system 22 automatically adapting projected input and output devices in response to an end user gesture. Initially, projected keyboard 118 is presented as a solid device with keys disposed in a standard configuration based upon placement of the end user hands in a typing position. A text window 122 presents typed inputs as the inputs are made to help an end user ensure the accuracy of typing on the projected input device without having to look up at display 16. The end user then introduces a gesture by sliding his hands apart to separate the keyboard into a left hand portion 124 and a right hand portion 126. A mouse pad 120 is projected between left hand portion 124 and right hand portion 126 as the portions separate from each other. The end user further adjusts left hand portion 124 and right hand portion 126 as desired, such as by rotating each hand to rotate each portion. In one embodiment, the end user locks keyboard 118 into place, such as by tapping the keyboard or projection surface. In an alternative embodiment, keyboard 118 has independently placed keys that shift as an end user's hands shift to maintain keyboard 118 in a relative position to the end user hands and fingers. For example, key inputs are determined by movements of fingers relative to each other and to hands as sensed by input sensor 112 rather than a fingers position relative to a projected key.

Text window 122 provides a flexible tool for an end user to more efficiently interact with projected devices. For a hunt and peck typist, text window 122 provides a convenient feedback of inputs made for a display distal keyboard 118 that would otherwise be viewed only by looking away from keyboard 118. Text window 122 provides a convenient touch-based tool to interact with typed text independent of the application display. For example, typing into projected keyboard 118 to write content for a word processing application displayed at table information handling system 22 displays the typed text both in text window 122 and display 16. The end user can highlight text, such as for a copy or to apply a font, by swiping the text at either text window 122 or display 16, and then apply the action to the text at either text window 122 or display 16, such as by pasting copied text directly into text window 122 to in effect paste the text into the application on display 16. As another example, an end user may display text in text window 122 in one language and at display 16 in a different language. Similarly, a tool bar 124 display near text window 122 provides ready interaction with applications by an end user without having to view display 16.

Figure 5:
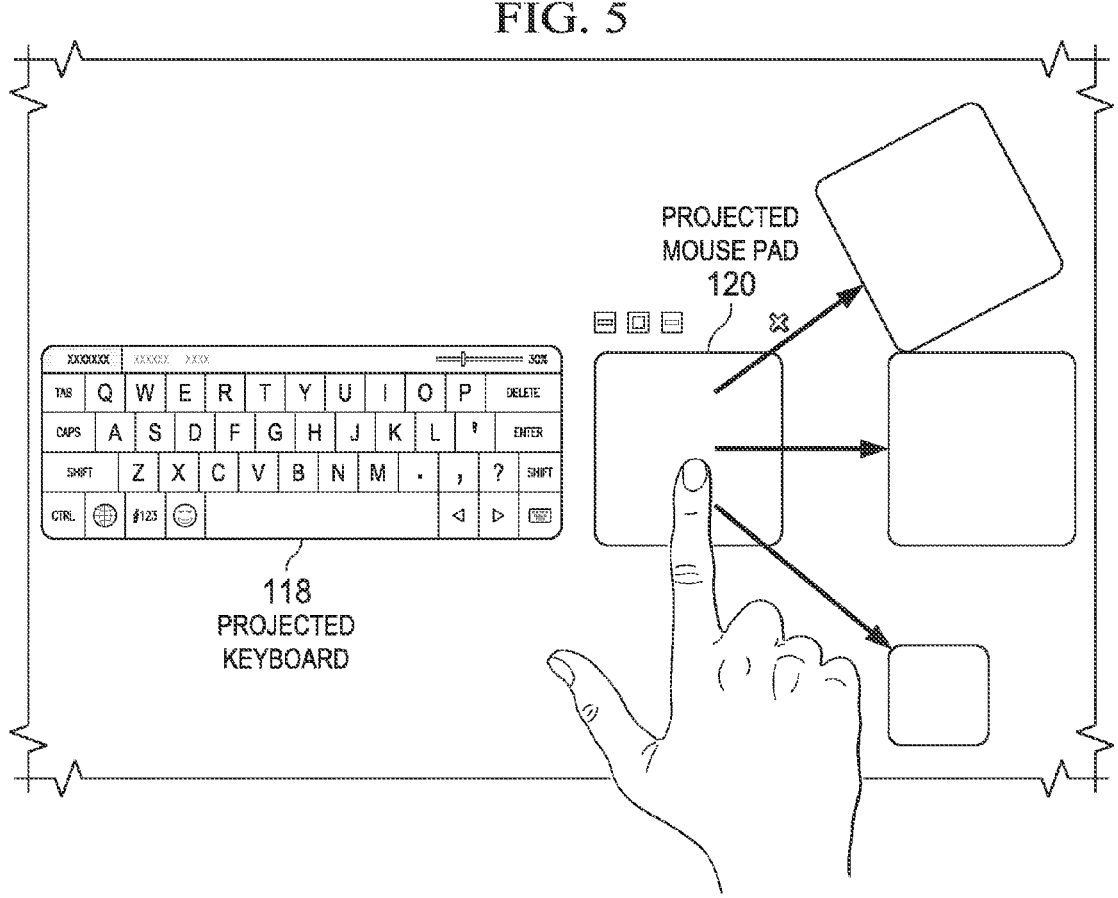
FIG. 5 depicts an example embodiment in which an end user changes the position of a mouse pad relative to a keyboard by pressing on the mouse pad and dragging the mouse pad to a desired location.

Projected keyboard 118 is controlled by inputs detected through input sensor 112 by reading hand and finger position, hand and finger motion, and eye movements. Pressing and dragging a corner of projected keyboard 118 provides manual re-sizing, or automated sizing adapts a projected keyboard 118 to an end user's hand size, hand position and typing behavior. Because there is no physical key-mapping, projected keyboard 118 dynamically switches layouts and symbols based on end user gestures. For example, an end user changes language of the keys by swiping the keyboard, or changes a projected toolbar 124 by swiping the toolbar, such as to bring up symbols or application short keys. As another example, as is depicted by FIG. 5, an end user changes the position of a mouse pad 120 relative to a keyboard 118 by pressing on the mouse pad and dragging the mouse pad to a desired location. In one embodiment, in order to delineate the active touchable area of mouse pad 120, a unique lighting effect is applied to the touchable area, such as a color or brightness distinct from the projection proximate the touchable area. The unique lighting also indicates when the mouse pad area is enabled to accept inputs and when it is disabled so that inadvertent inputs are not made, such a luminescence when active translucence when inactive.

Referring now to FIG. 6, an example embodiment depicts physical anthropometry to adapt projected devices to an identified end user. Projected keyboard 118 is depicted with content tabs 126 deployed in various locations relative to keyboard 118. The position and accessibility of the content tabs 126 are determined from the context at the projected devices, such as context gleaned from identification information captured by an input sensor 112. For example, input sensor 112 is a camera that captures an image of an end user's hand and analyzes the image to detect unique features, such as rings, skin patterns, fingernail length, hair color, watches, bracelets, etc. . . Physical anthropometry determines specific projected devices to present, such as based on projected device preferences of an identified end user, and a level of authentication and access provided to a user. For instance, if unique features are detected and associated with an end user, a low level of authentication provides the user with access to some information, such as access to a VoIP phone under the user's name, while more sensitive information is withheld until a passcode is provided. As another example, content tab A is made available to all end users and provides general processing features; content tab B is made available only if some level of identification is achieved for an end user; and content tab C is made available if a positive identification is made of an end user. In one example embodiment depicted by FIG. 6, three content tabs 126 are projected across the top portion of keyboard 118 where an end user sets up a long projected keyboard; in another example embodiment, a smaller keyboard 118 provides less room to project content tabs, so that content Y is projected in a safe mode at a side position. An end user selects a content tab by pressing on the projection to access information or functions associated with the content tab.

Figure 7:
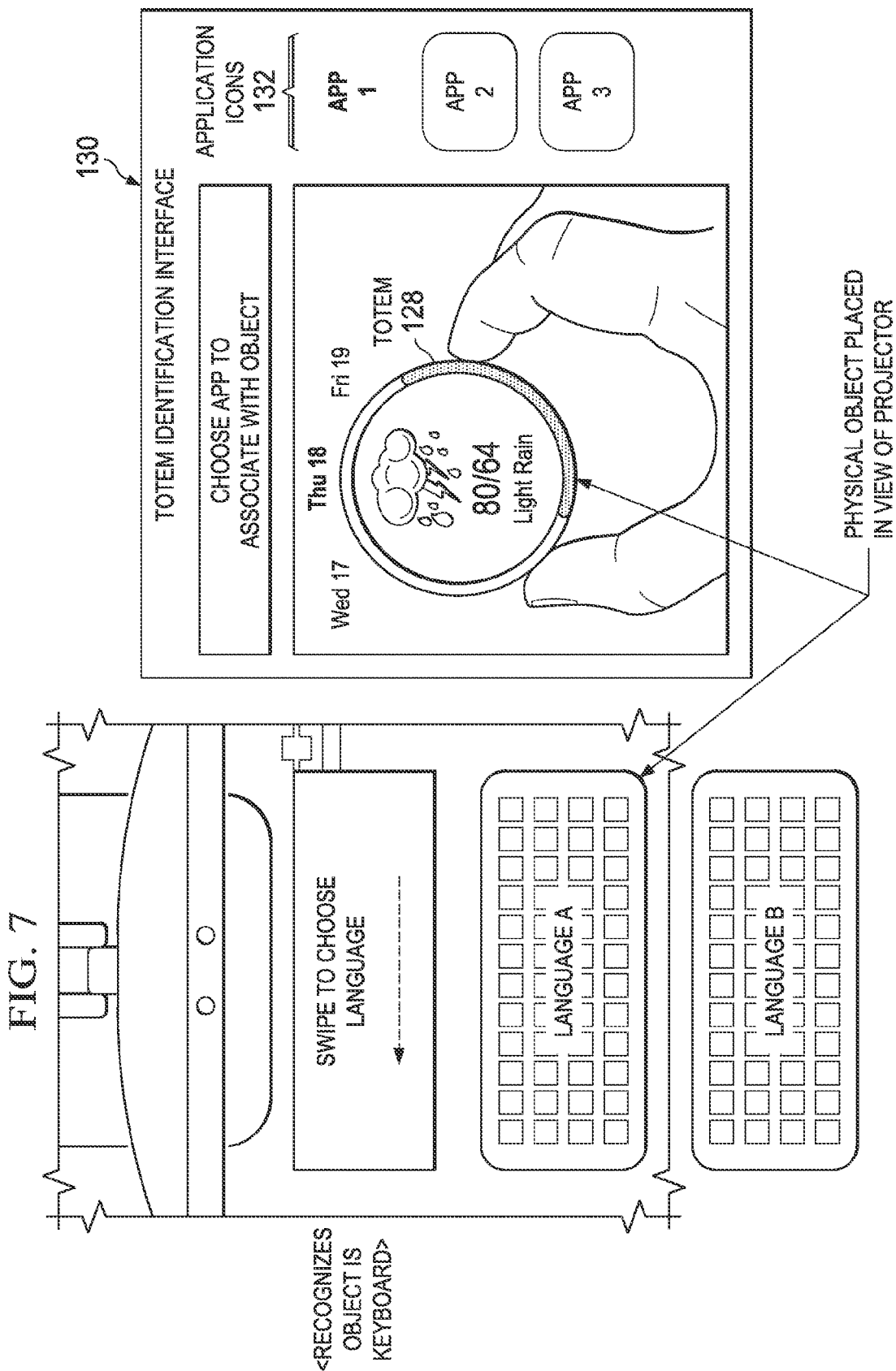
FIG. 7 depicts an example embodiment of totem adaptive projected devices.

Referring now to FIG. 7, an example embodiment depicts totem adaptive projected devices. Totem 128 is an object with an identifiable feature that input sensor 112 captures in order to determine projected devices to present to an end user or to control some aspect of an information handling system with or without visual feedback to an end user). In the example embodiment, totem 128 indicates selection by an end user of a projected keyboard having a defined language when totem 128 is placed on the projection surface. Totem 128 defines any number of features and is configurable by an end user. For example, totem 128 in the example embodiment defines a keyboard language and an order of keyboard languages in the event an end user swipes the keyboard to change languages. In one embodiment, the identifiable feature of totem 128 is text read by an OCR of input sensor 112, or a bar code read by a bar code reader of input sensor 112. If a totem 128 is placed on the projection surface and not identified by input sensor 112, then an end user is provided an opportunity to define projected devices associated with the totem. For example, a totem identification interface 130 is automatically initiated with application icons 132 that an end user touches to associate the totem with an application, functionality or projected device. Once the totem is tagged with an application, placing the totem in a projection surface will initiate the application automatically. A totem 128 may have a predefined shape recognizable through an image taken by input sensor 112, or ordinary objects may be assigned as totems by end users.

Figure 8:
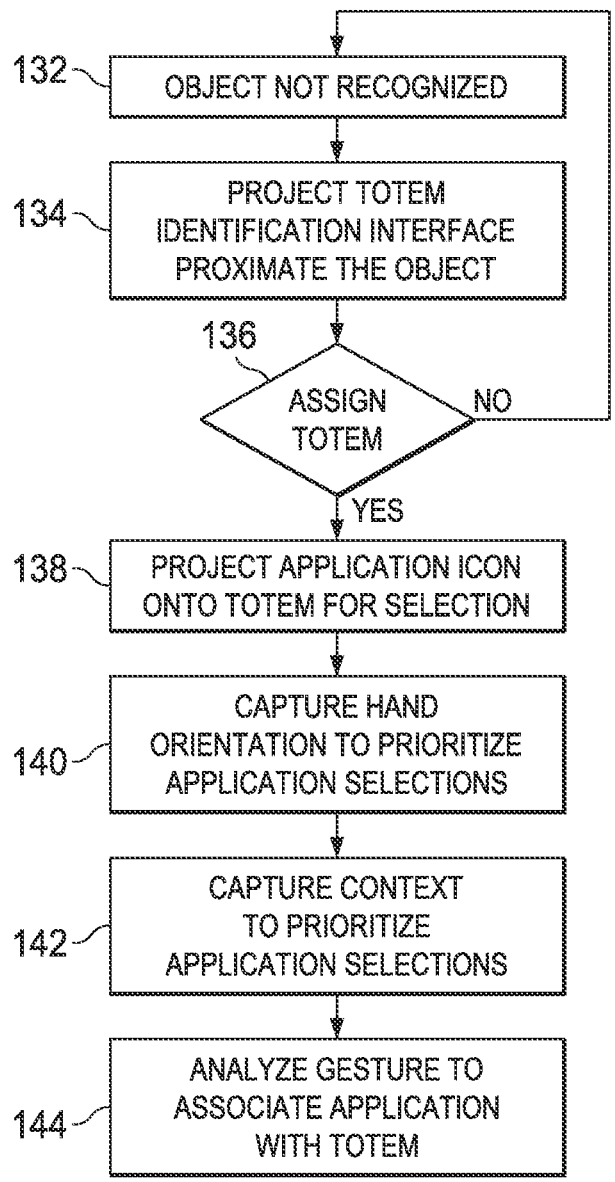
FIG. 8 depicts a flow diagram of a process for associating a totem with an application.

Referring now to FIG. 8, a flow diagram depicts a process for associating a totem with an application. The process starts at step 132 when a totem or other object detected by tablet information handling system 22 through input sensor 112 is not recognized. In alternative embodiments, other types of information handling systems may use totems, as set forth above. At step 134, a totem identification interface is projected proximate the detected object. At step 136, a determination is made of whether an end user desires to assign meaning to the totem. If the end user closes the totem identification interface, the process returns to step 132 and tablet information handling system 22 stores the object as not associated with an application so that the end user is not queried again regarding the object. The end user can manually initiate step 134 at a later time to associate an object with application tasks and/or projected I/O devices. If the end user does not close the totem identification interface, the process continues to step 138 to project an application icon onto the totem for selection of the application by the end user for association with the totem. At step 140, hand orientation is captured by input sensor 112 so that tablet information handling system 22 can apply the hand orientation to prioritize application selections for association with the totem. At step 142 context of the desktop is captured to prioritize application selections and stored for reference with subsequent use of the totem. At step 144, hand gestures are analyzed to assign the totem to an application, such as a tapping by the end user when the desired application is presented on the totem. In one embodiment, the location of the totem on the desktop is used as a key for determining the location of projected devices related to the totem. For instance, an end user puts a totem down to present a word processing projected display and moves the totem to place the word processing projected display in a desired location of the projection surface.

Referring now to FIG. 9, an example embodiment depicts adaption of projected devices in response to detection of an end user's hand intervening between a projector and a projection surface. Projected keyboard 118 is presented at a projection surface by a projector without illumination of an end user's hand disposed over top of projected keyboard 118. An end user makes inputs at the projected keyboard 118 that are detected by an input sensor of an information handling system that manages the projector. Similarly, a projected writing pad 148 is presented at a projection surface by a projector without illumination of an end user's hand disposed over top of the projected writing pad 148. An end user writes text or other content on projected writing pad 148 with a writing instrument 150 by using a writing tip portion 152 to trace inputs and an eraser portion 154 to remove inputs. An input sensor of an information handling system that manages the projector detects the motion of writing tip portion 152 or eraser portion 154 to record the inputs made by writing instrument 150. Although the end user's hands and writing instrument 150 intervene between the projector that projects keyboard 118 and writing pad 148, the projector output is adapted so the end user's hand and writing instrument 150 are not illuminated. Uncorrected projected keyboard 156 and uncorrected writing pad 158 illustrate how the end user's hand and writing instrument 150 would be illuminated by the projection of keyboard 118 and writing pad 148 if the projected light is not adapted to avoid illumination of the end user's hand and writing instrument 120. In one example embodiment, the projector casts black pixels against the end user's hand and writing instrument 150. In an alternative embodiment, the projector dumps light at pixels that intersect with keyboard 118 and writing pad 148 so that no light emits as the projector light source scans those pixel locations.

A projector dynamically masks objects to avoid illumination of the objects by analyzing input sensor object detections to identify the positions of objects that should not be illuminated and then projecting an image adapted to avoid illumination at the locations where the projected light intersects with the object. As an example, a depth camera input sensor determines the position of an object so that the projector casts black pixels at the determined position. A depth camera input sensor may use structured light to determine position and shape, such as infrared light included with the image cast by the projector. In such an embodiment, the projector may continue to illuminate intervening objects with structured light to provide information on depth, such as illumination of infrared light. Alternatively, a camera input sensor may use the color of the object or illumination that reflects from an object as positional information relating to the object. If multiple input sensors are available, such as input sensors from multiple devices that are interfaced through wireless or network communications, the object position may be determined with increased accuracy using triangulation or averaging techniques. In one embodiment, an input sensor off-angle from a projector may use shadows formed beneath objects to determine the angle from the projector that intersects with the object. In another embodiment, a second projector off-angle from the projector that casts projected keyboard 118 will fill in the shadow formed by an object by projecting from off-angle into the shadow.

Figure 11:
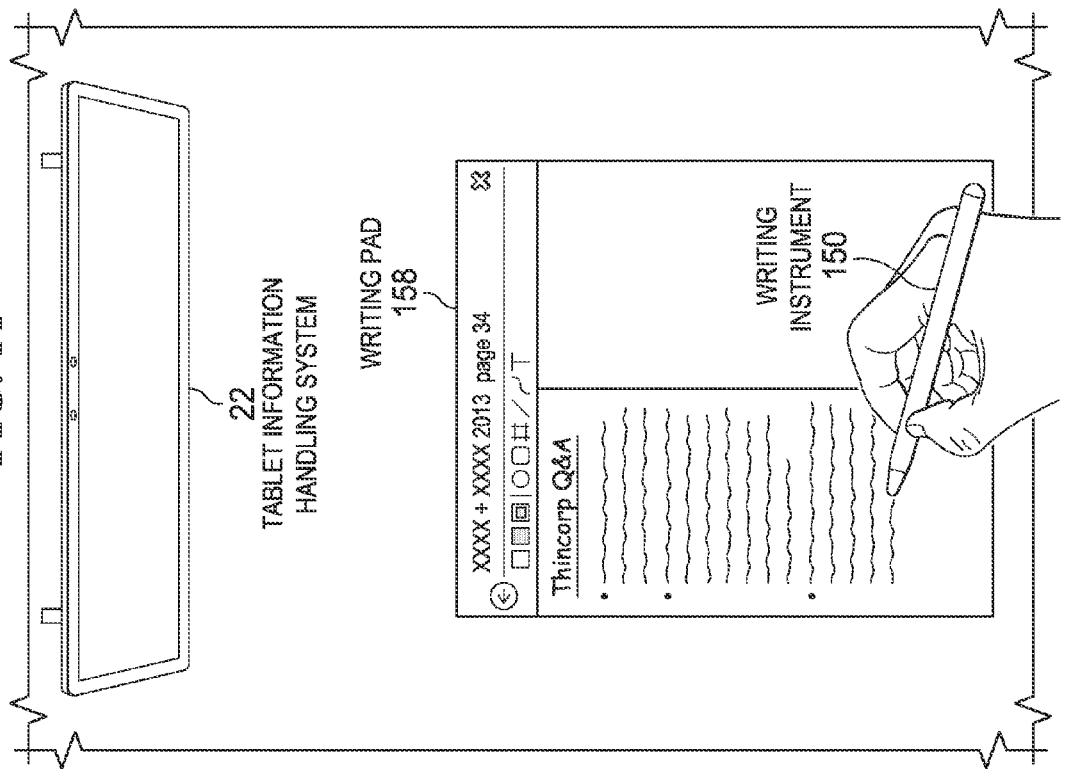
FIG. 11 depicts an example embodiment of adaption of a projected writing pad in response to a writing instrument intervening between a projector and a projection surface.
Figure 10:
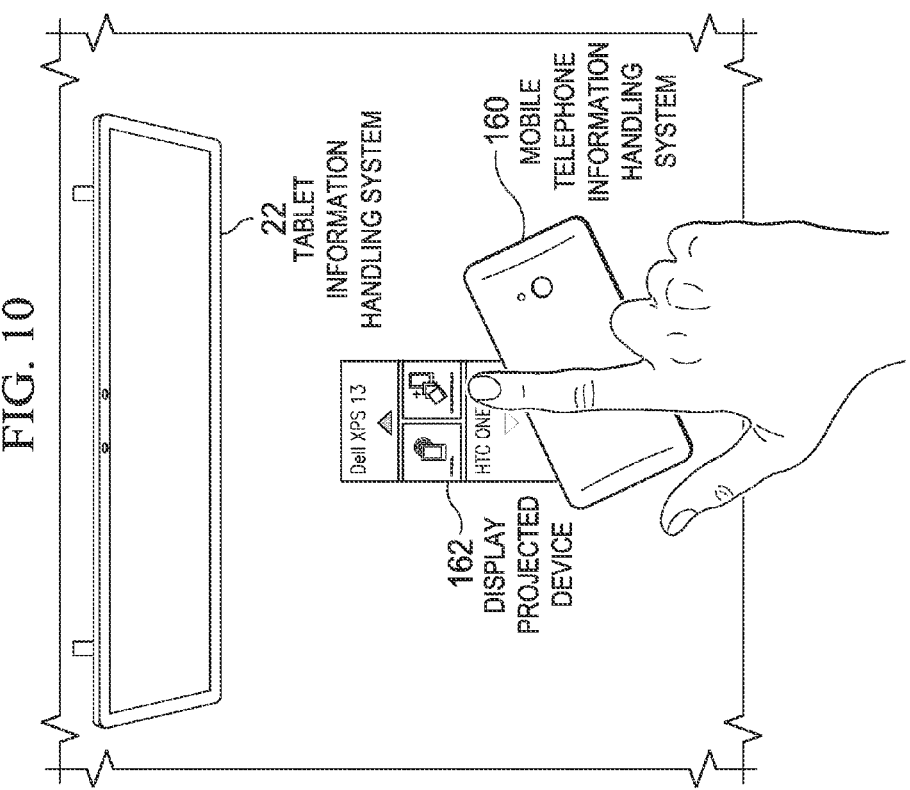
FIG. 10 depicts an example embodiment of adaption of projected devices in response to objects intervening between a projector and a projection surface.

Referring now to FIG. 10, an example embodiment depicts adaption of projected devices in response to objects intervening between a projector and a projection surface. A hand and a smartphone information handling system 160 placed on a projection surface are detected by an input sensor of tablet information handling system 22 and integrated into a display projected device 162 presented by a projector of tablet information handling system 22. In the example embodiment, the projector darkens pixels that intersect the position of the hand and smartphone information handling system 160. Similarly, FIG. 11 depicts an example adaption of a projected writing pad in response to a writing instrument intervening between a projector and a projection surface. The projector of tablet information handling system 22 darkens pixel that intercept the position of the hand and writing instrument 150 over writing pad 158. Although positional knowledge provided by an input sensor of an object intervening between a projector and a projection surface allows a projector to avoid illumination of an object, in some instances illumination may be desired. For instance, display projected device 162 may illuminate over top of smartphone information handling system 160 to add to a local display of information or to point out a physical feature on smartphone information handling system 160, such as the location of a synchronization or charging cable.

In one example embodiment, tablet information handling system 22 recognizes smartphone information handling system 160 based upon an image captured by an input sensor. In response to recognition of smartphone information handling system 160, tablet information handling system 22 automatically initiates actions, such as launching one or more applications or transferring defined data. For example, if smartphone information handling system 160 is face up, tablet information handling system 22 initiates a network interface and action, such as using smartphone information handling system 160 as a WiFi hotspot, establishing a peer-to-peer network interface for information transfer, establishing a Bluetooth interface so that a projector of tablet information handling system 22 automatically projects a keyboard that interacts as a peripheral of smartphone information handling system 160, or projecting the display of smartphone information handling system 160 with a projector of tablet information handling system 22 based on a network interface, such as a WPAN interface. As another example, if smartphone information handling system 160 is face down, an automatic synchronization of pictures is performed to tablet information handling system 22 using a wireless interface. In one example embodiment, after synchronization of pictures, new pictures stored on smartphone information handling system 160 but not on tablet information handling system 22 are automatically projected as a display on the projection surface. In another alternative embodiment, various options such as those listed above are presented as a projected display so that the end user may manually select an option by tapping on the option in the projected display. For example, changing the position of the smartphone may be used as a gesture to initiate a certain action. For instance, flipping the smartphone from face up to face down may be used to terminate an existing connection, such as a VoIP telephone call or a wireless network interface. Rotating the phone from one orientation to another may change the direction of synchronization from the phone to the tablet or from the tablet to the phone.

Figure 12:
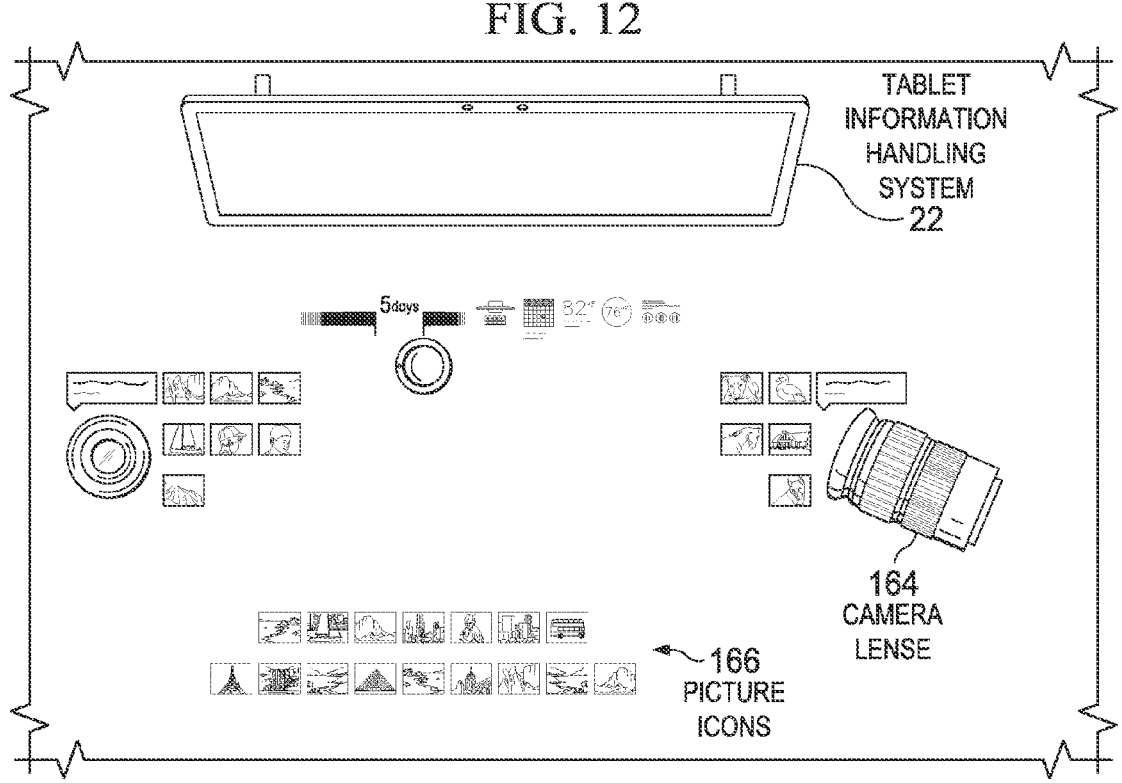
FIG. 12 depicts an example embodiment of initiation of a metadata search responsive to detection and identification of an object for presentation of the metadata search result in a projected output display device.

Referring now to FIG. 12, an example embodiment depicts initiation of a metadata search responsive to detection and identification of an object for presentation of the metadata search result in a projected output display device. In the example embodiment, tablet information handling system 22 has an input sensor that detects a camera lens 164 placed on the projection surface. In response to the identification of camera lens 164, tablet information handling system 22 performs a metadata search with tablet information handling system 22 of pictures taken by camera lens 164 and presents a projected output display of picture icons 166 selectable by an end user touch. In one example embodiment, the input sensor captures information that helps to identify camera lens 164 for narrowing the search. For instance, a brand name or logo on camera lens 164, a focal length, a color, etc. . . . may be analyzed and used to obtain a search for data relevant to the particular camera lens 164 placed on the projection surface rather than performing a search for all pictures. For instance, if an input sensor captures a brand name on a mobile telephone placed on the projection surface and tapped by an end user, tablet information handling system responds to the tap by projecting a device that lists available applications on the mobile telephone, such as streaming music, streaming videos, or placing a call. The end user selects an application with the projected device so that tablet information handling system initiates the application on the mobile telephone through a wireless interface in response to detection of the tap by an input sensor. In one example embodiment, identification of objects is enhanced by reference to a crowd source database of previously-identified objects. In an alternative embodiment, manual training to identify objects similar to the manual training for totems as set forth in FIG. 8. In another alternative embodiment, other objects captured by the input sensor provide context to aid in determining a response to an "action" object. For example, presence of a coffee cup, keys, glasses, a wallet, etc. . . . provide indications regarding an action associated with an identified object. Projected devices may selectively adapt based upon a detected context of non-action objects, such as by selecting a desktop configuration of projected devices and applications.

Referring now to FIG. 13, an example embodiment depicts capture of a physical desktop element into a virtual workspace. An end user has placed a paper note 168 on the desktop projection surface within the field of view of an input sensor, such as a webcam of tablet information handling system 22. In response to sensing of paper note 168, tablet information handling system 22 captures writing on the note into a digital file, such as by performing optical character recognition. After scanning and digitizing paper note 168, tablet information handling system 22 projects the content of paper note 168 as a paper note projected device 170. Paper note projected device 170 may be projected to one side of paper note 168 to inform the end user of the availability of the digital content. Alternatively, paper note projected device 170 is presented upon removal of paper note 168 from the projection surface. In alternative embodiments, other types of physical media are scanned and made available with interactive digital content. For example, a pizza coupon on the projection surface is automatically scanned to allow an end user to gesture at the pizza coupon to call a phone number on the pizza coupon or bring up a web page with a URL on the pizza coupon. As another example, content on a paper medium is digitized and used to perform a search for related material, such as a web search or a search of information stored locally. As yet another example, business cards are automatically scanned and added to an address book.

Figure 14:
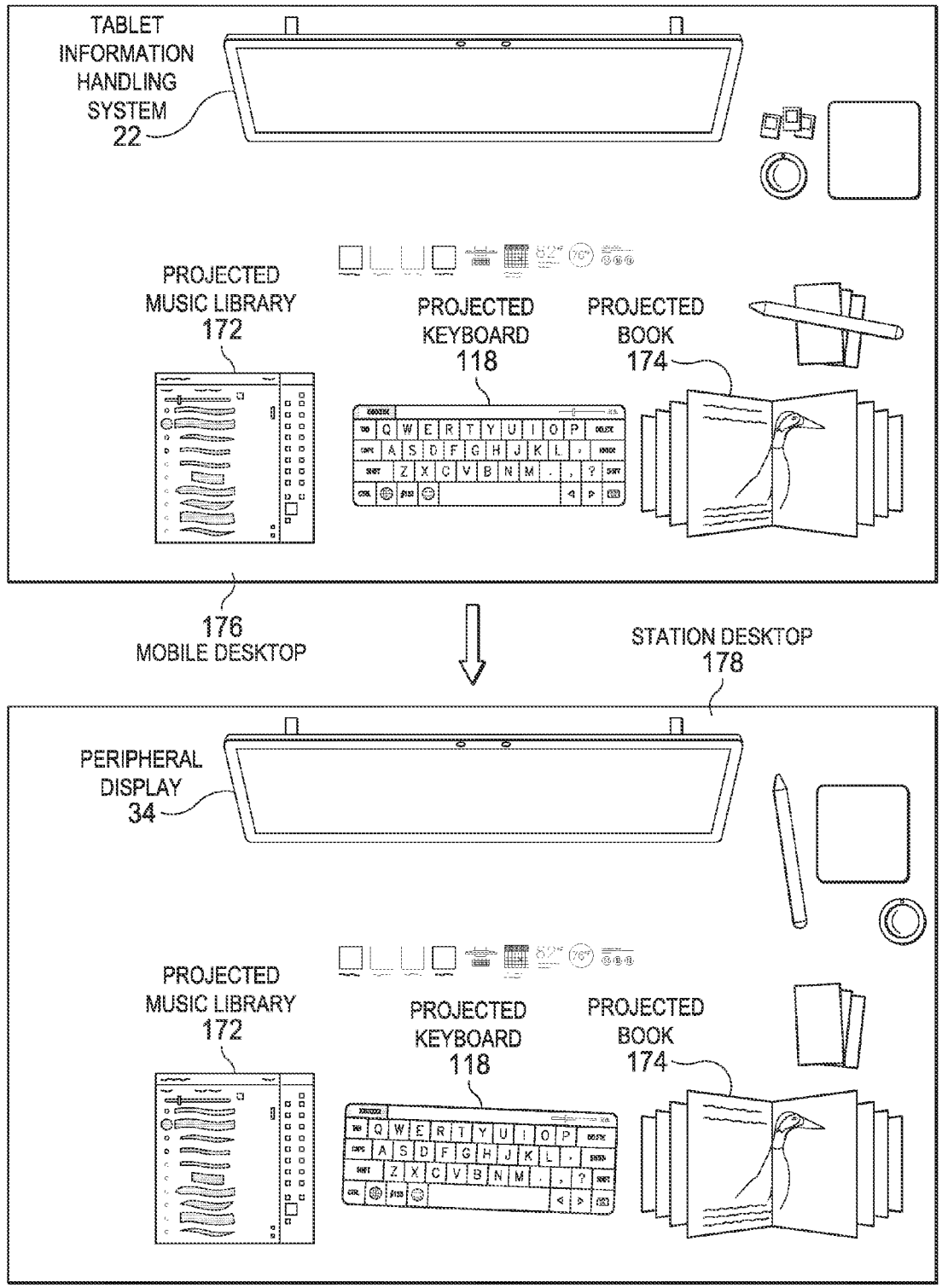
FIG. 14 depicts an example embodiment of transferable projected desktop configurations supported across different information handling systems.

Referring now to FIG. 14, an example embodiment depicts transferable projected desktop configurations supported across different information handling systems. A tablet information handling system 22 projects a desktop configuration having a projected keyboard 118, a projected music library 172 and a projected book 174 at a mobile desktop location 176. The projected desktop configuration includes the configuration of the projected devices and data that populates the projected devices, such as a playlist presented on projected music library 172 or a document presented in a word processing projected display window. The desktop configuration is stored locally at tablet information handling system 22 so that an end user can power down the system at one location and then rapidly power up the system with the same desktop configuration at another location. If the configuration is stored locally, it can be easily shared with another device that has similar capabilities. For example, the desktop configuration of a tablet can be easily shared with a stationary desktop set-up in the absence of network storage by sharing a configuration file. In the example depicted by FIG. 14, a peripheral display 34 located at a station desktop 178 has recreated the desktop configuration of tablet information handling system at a distal location. Advantageously, an end user is able to recreate a desktop environment at different locations with disparate information handling systems by projecting devices at the different locations in a common manner. In one alternative environment, an end user recreates a desktop configuration that projects devices in one location where the physical devices are not available. For example, an end user in station desktop 178 has a physical keyboard that is not available at mobile desktop location 176; in order to recreate the end user's desktop configuration, mobile desktop location 176 projects a keyboard where the physical keyboard existed in the station desktop 178. Similarly, mobile and station desktop configurations are selectively populated with data stored locally or at network locations to provide as an accurate of a desktop recreation as is available.

Figure 15:
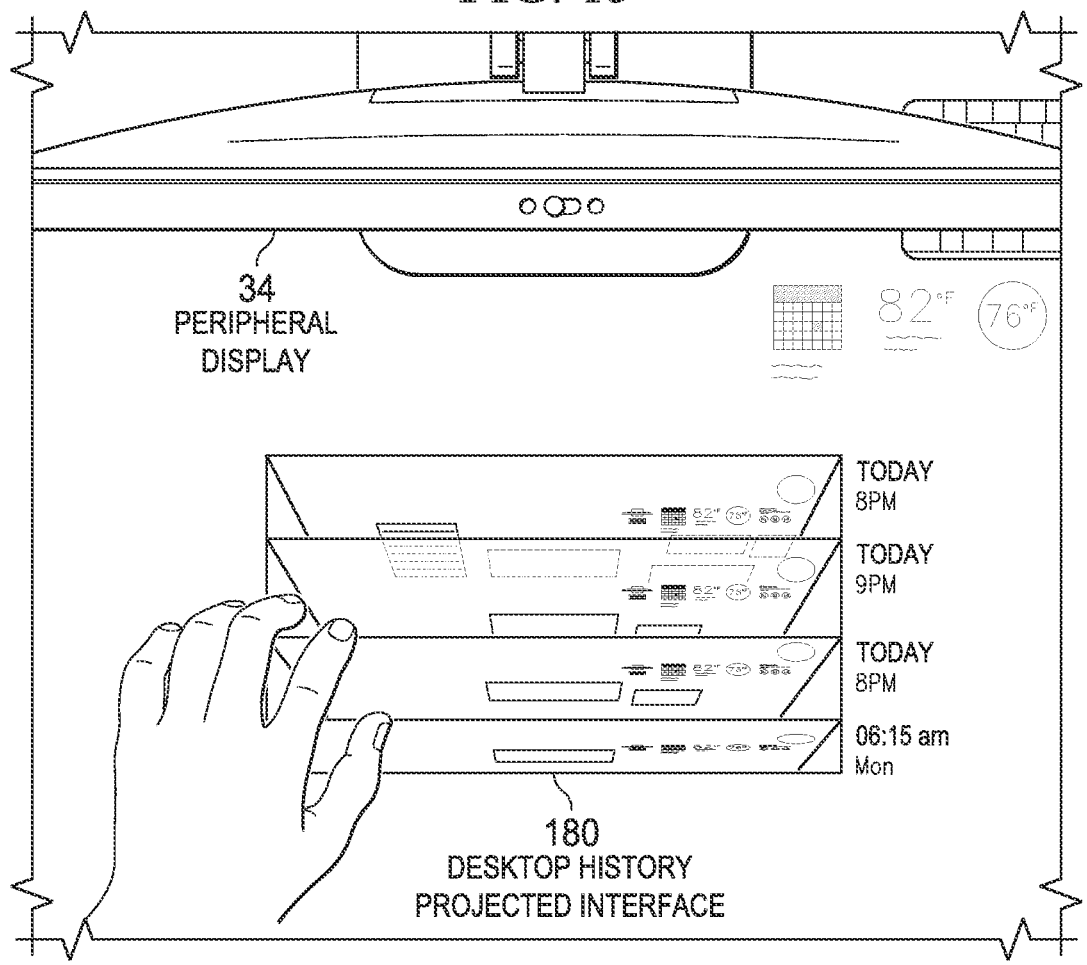
FIG. 15 depicts an example embodiment of a desktop history to recreate projected desktop configurations at selected of different time periods.

Referring now to FIG. 15, an example embodiment depicts a desktop history to recreate projected desktop configurations at selected of different time periods. A desktop history projected interface 180 provides time or event indexed references to desktop configurations of an end user so that an end user can rapidly recreate a projected desktop by selecting an entry. The state and history of projected desktops are stored locally or at a network location at predetermined time intervals or predetermined events like application initiations. An end user can end a session at one location with a first information handling system, travel to another location with a second information handling system and then scroll through desktop history projected interface 180 to recreate a past desktop configuration, both unpopulated with data or populated with data from a defined historical state selected from the history. For example, an end user begins the day by opening an information handling system personal desktop configuration without data to project a desktop with a newspaper and personal email opened and populated with current data. The user remembers a story from yesterday's paper, so the user opens desktop history projected interface 180 and scrolls through the index to the day before in order to populate the desktop with the previous paper. The end user then shuts down his system and goes to the office. At the office, the end user picks up where he left off the previous day by opening desktop history projected interface 180 to open the desktop configuration from the close of the previous day populated with the data from the previous day. The end user has a quick and readily available resource to locate and view relevant information based upon reference points that are memorable to an end user.

Figure 16:
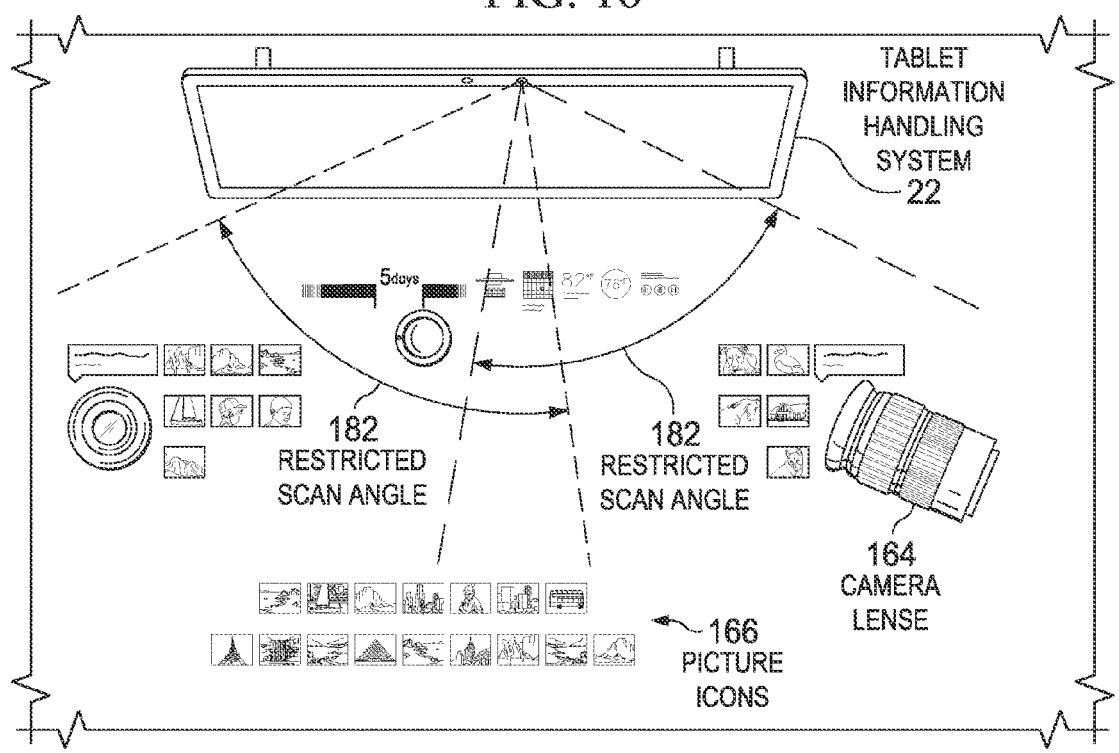
FIG. 16 depicts an example embodiment of projected desktops created by plural point light sources working in cooperation with each other.

Referring now to FIG. 16, an example embodiment depicts projected desktops created by plural point light sources working in cooperation with each other. Tablet information handling system 22 projects a desktop with first and second restricted scan angles 182, each of which projects on independent portions of the projection surface. For instance, one half of the projection surface has projected devices presented by a first point light source and the opposite half of the projection surface has projected devices presented by a second point light source. Generally, the point light sources are MEMS devices that generate a laser beam scanned across a projection surface with mirrors. By having multiple point light sources to generate projected devices, the effective brightness of the projected devices is increased. Separating a projection surface into separate regions of different sizes, each projected by a separate point light source, increases the flexibility for adjusting scan rates to create images of differing brightness levels and resolution. Further, by changing the restricted scan angles 182 to at least partially overlap, greater flexibility for generating images is provided through cooperation of the point light sources.

Figure 17:
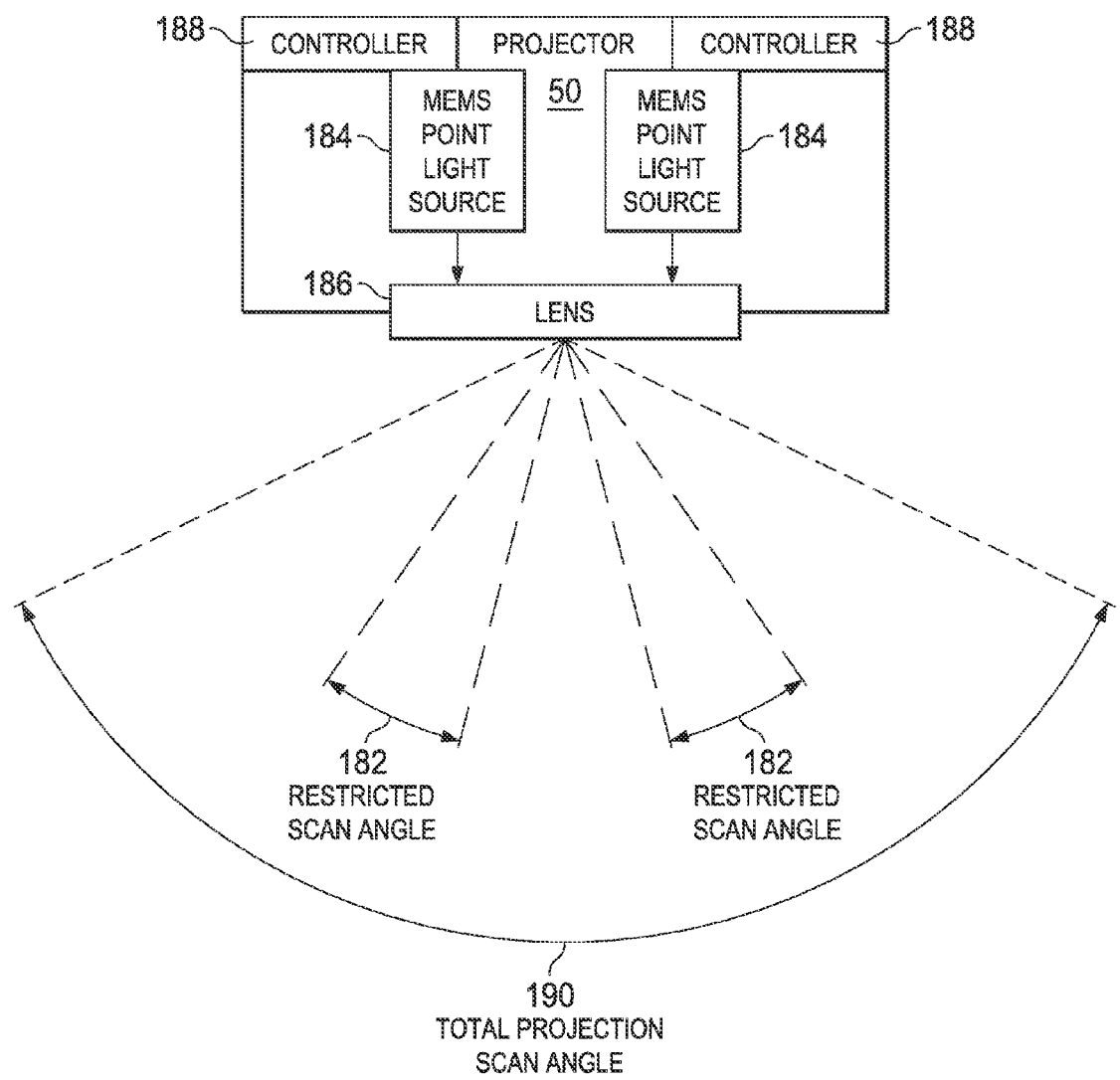
FIG. 17 depicts a block diagram of a projector having plural MEMS point light sources sharing a common lens structure.

Referring now to FIG. 17, a block diagram depicts a projector 50 having plural MEMS point light sources 184 sharing a common lens structure 186. In the example embodiment, each MEMS point light source 184 has an independent controller 188 to manage its scan, however, in alternative embodiments the plural MEMS point light sources 184 may share a common controller 188. Sharing a common lens structure reduces the cost of projector 50 relative to the cost of having a separate lens structure 186 for each point light source 184. In bright conditions, both point light sources 184 combine to increase the effective illumination of projected displays by either tracing a common path or by each illuminating separate portions of a projection surface. In dark conditions, power consumption is managed by illuminating projected devices with only one of the point light sources 184, thus reducing power consumption. In the example embodiment, both point light sources have a total projection scan angle 190 and are selectively capable of performing a restricted scan angle 182. By overlapping a restricted scan angle 182 with both point light sources, each light point source traces a reduced portion of the projection surface to provide a more effective scan rate and thus throw greater illumination in a smaller area for more precise and more brightly illuminated output devices. As set forth in greater detail in the example embodiments that follow, selective tracing of common portions of a projection surface improves the flexibility for projecting input and output devices to improve the end user experience. In another embodiment, the MEMS device scan angles are set to not overlap thereby creating side-by-side projected images with each image side projected by a single MEMS device.

Figure 18:
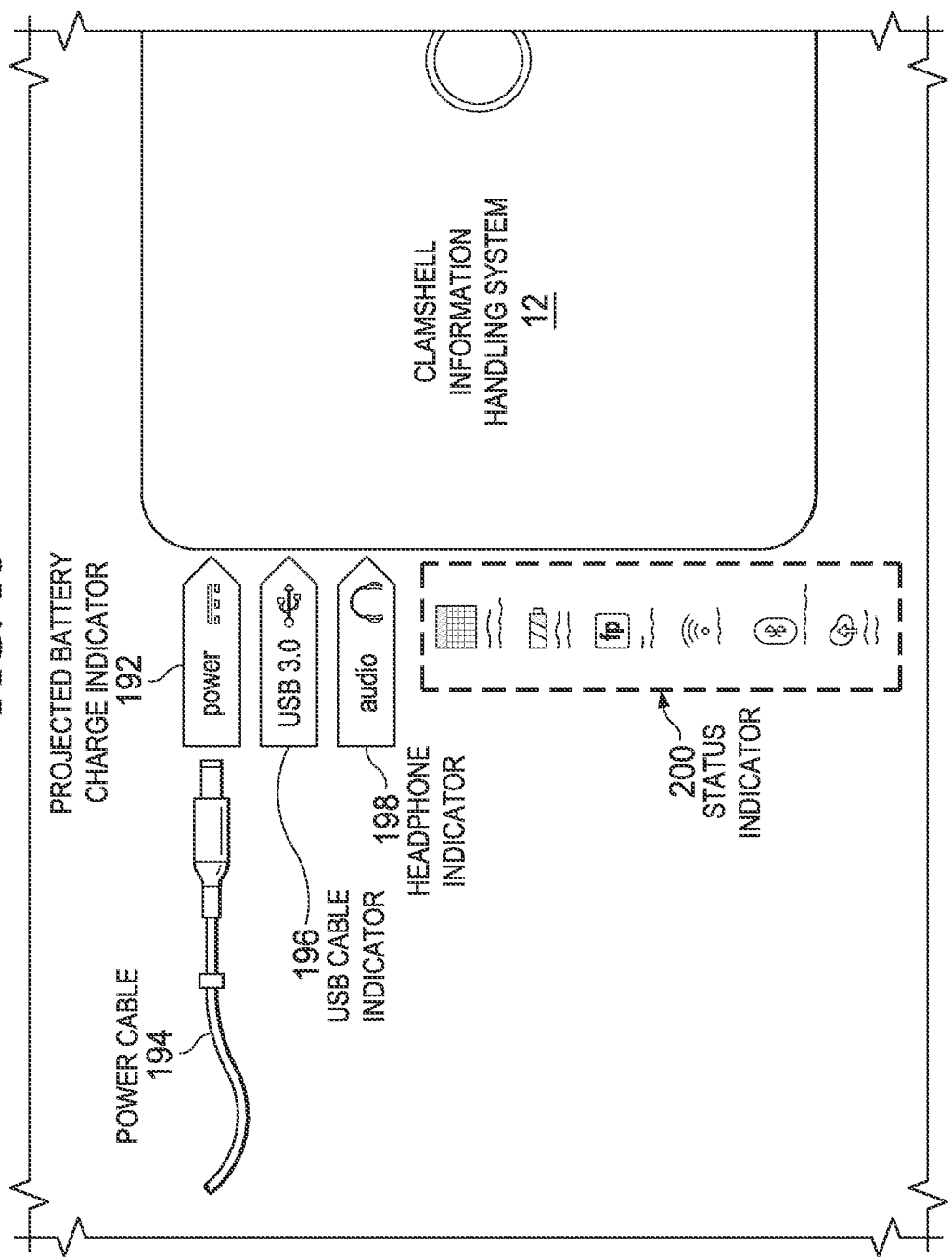
FIG. 18 depicts an example embodiment of projected desktops having interactive interfaces with physical components.

Referring now to FIG. 18, an example embodiment depicts projected desktops having interactive interfaces with physical components. A clamshell information handling system 12 is in a closed position, such as might be used when operating at a docking station. In order to inform an end user about the operational state of clamshell information handling system 12, projected output devices are presented next to the system housing that relate to physical components of the system. For example, a projected battery charge indicator 192 has an arrow that directs an end user where to place a power cable 194 to charge a battery integrated in clamshell information handling system 12. Projected battery charge indicator 192 is generated in response to a predetermined battery condition, such as a low charge. Alternatively, projected battery charge indicator 192 is automatically generated when power cable 194 is detected by an input sensor, indicating that an end user is attempting to put power cable 194 into a power port. Illumination of the power port as power cable 194 approaches aids the end user in the insertion of power cable 194 in low light conditions. A USB cable indicator 196 provides an arrow to help an end user insert a USB cable in a USB port indicated by the arrow. Similarly, a headphone indicator 198 provides an arrow to help an end user insert a headphones cable into a headphones port. In alternative embodiments, alternative types of cables and ports are supported with an input sensor analyzing a cable as the cable approaches the information handling system in order to identify which port the cable should be directed to enter. A set of projected status indicators 200 provide interactive icons that an end user can select to obtain access to control of physical components, such as power consumption settings, network settings, Bluetooth settings and administrative applications.

Physical component interactive projected devices, such as those depicted by FIG. 18, may be projected by a projector integrated in an information handling system having the physical components or by other projectors of a desktop. For example, a docking station may include an input sensor and a projector tasked with monitoring for end user interactions with desktop resources and providing visual indications, such as arrows, of how the end user can interact with the desktop resources. Projection of physical component notifications and use-cues help an end user to better know what physical components are needed for support and how to interact with the physical components. In one embodiment, an end user out of box experience is enhanced by projecting physical component interaction cues as an introduction to a new information handling system. For example, a projector simultaneously presents a video introduction of system components and capabilities while pointing out the location of components with projected arrows and other interactive guides.

Referring now to FIG. 19, an example embodiment depicts adjusted scan angle use at a projected desktop to avoid projection of devices onto objects. As set forth above, a MEMS point light source scan angle adjusts so that the image projected by the MEMS point light source varies in dimensions. Conventional "letter boxing" solutions scan the same trace for images of different dimensions, but dump or blacken pixels at inactive portions of the projection surface. This conventional letter boxing approach tends to increase power consumption by dumping light and also tends to reduce the amount of illumination available for scanning the point light source at the projection surface. To address these limitations, the MEMS point light source changes the scan angle used to trace pixels across the projection surface based upon predetermined condition, such as to match the scan to the aspect ratio of content within a projected display. In the example embodiment of FIG. 19, an input sensor detects interfering objects 202 disposed between a projector and a projection surface. In response to the detection of interfering objects 202, tablet information handling system 22 projects a restricted scan angle 182 instead of the complete projection scan angle 190. Since the MEMS point light source does not trace interfering objects 202, no light is projected on the interfering objects 202 and a greater effective luminance is available to project desired images in a smaller projection surface. The end user can set the projector to truncate off the portion of the projection that overlaps interfering objects 202, or can re-size images to fit in the smaller available projection surface.

Figure 20:
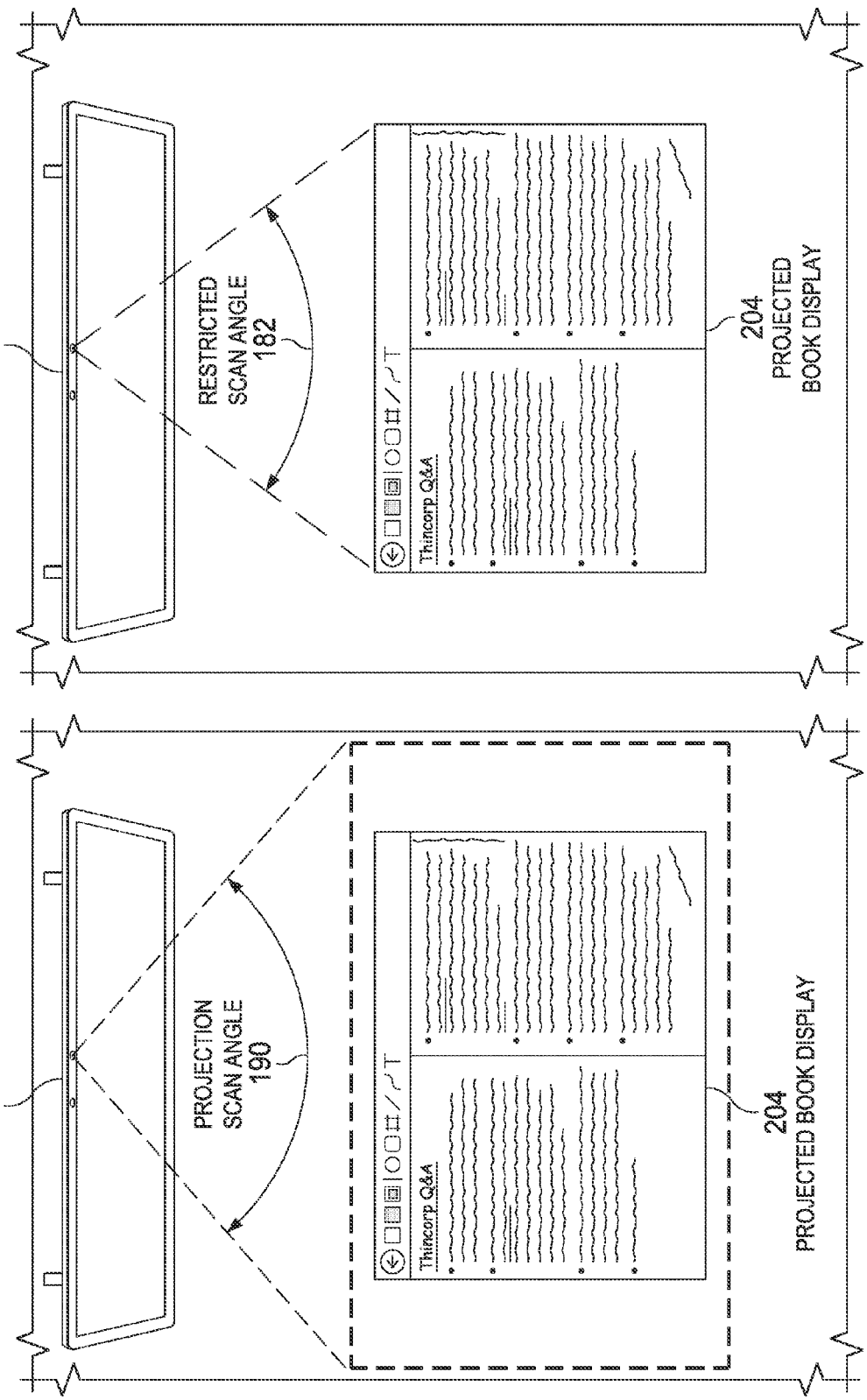
FIG. 20 depicts an example embodiment of adjusted scan angle use at a projected desktop to adapt a projected device to the size of included content.

Referring now to FIG. 20, an example embodiment depicts adjusted scan angle use at a projected desktop to adapt a projected device to the size of included content. Tablet information handling system 22 projects a projected book display 204 that, when using the full scan angle 190, has inactive letter boxing that frames the book content portion. The projector in tablet information handling system 22 adjusts the scan of the point light source that generates projected book display 204 so that substantially only the native resolution of the content is scanned and the inactive letter box around the content is not scanned. The scan angle need to project content may be determined from the processing of the content at tablet information handling system 22 or, alternatively, by capturing an image with an input sensor and analyzing the image to determine the position of active versus inactive content. By limiting projector scan angle to substantially only that portion of the projection surface that has content, the available illumination is most efficiently used to present content, and power consumption is reduced for a given level of illumination since fewer black pixels are projected in support of letter boxing. In one embodiment, this results in an effective change to the resolution of the image that is communicated to a graphics image so content is rendered with appropriate resolution.

Referring now to FIG. 21, an example embodiment depicts adjusted scan angle use at a projected desktop to enhance illumination at moving images. Tablet information handling system 22 generates a display that includes a window having a video movie. When one projector is used across total scan angle 190 each portion of the projection surface 60 is traced in an equal fashion even though movie images within a video window 206 typically have an improved appearance when presented with a more rapid scan rate. In order to improve the projection of the video window 206, a projector with multiple MEMS point light sources dedicates one point light source to restricted scan angle 182 corresponding to the video window 206. The other MEMS point light source scans the total scan angle 190 to illuminate the portions of projection surface 60 outside of the video window 206. In one embodiment, the point scan MEMS scans the 190 degrees at a 30 Hz rate instead of a 60 Hz rate typically used, and the intermediate time used to scan the video content is at a 760 Hz rate. In another embodiment, both MEMS point light sources scan the video window 206 with the majority of illumination provided by the point light source having restricted scan angle 182. In another embodiment, two separate projectors provide illumination instead of one projector with two point light sources and a shared lens structure. Alternatively, one point light source may illuminate both the entire projection surface 60 and video window 206 by performing more scans at video window 206 than are performed at the rest of projection surface 60. For example, the point light source traces an image over the entire projection surface 60 followed by tracing an image over just video window 206. In order to maintain presentation of a projected image across the entire projection surface 60, the projector scans the projection surface every 20 ms to meet a minimum eye persistence and then uses the time between scans to trace only video window 206.

Figure 22:
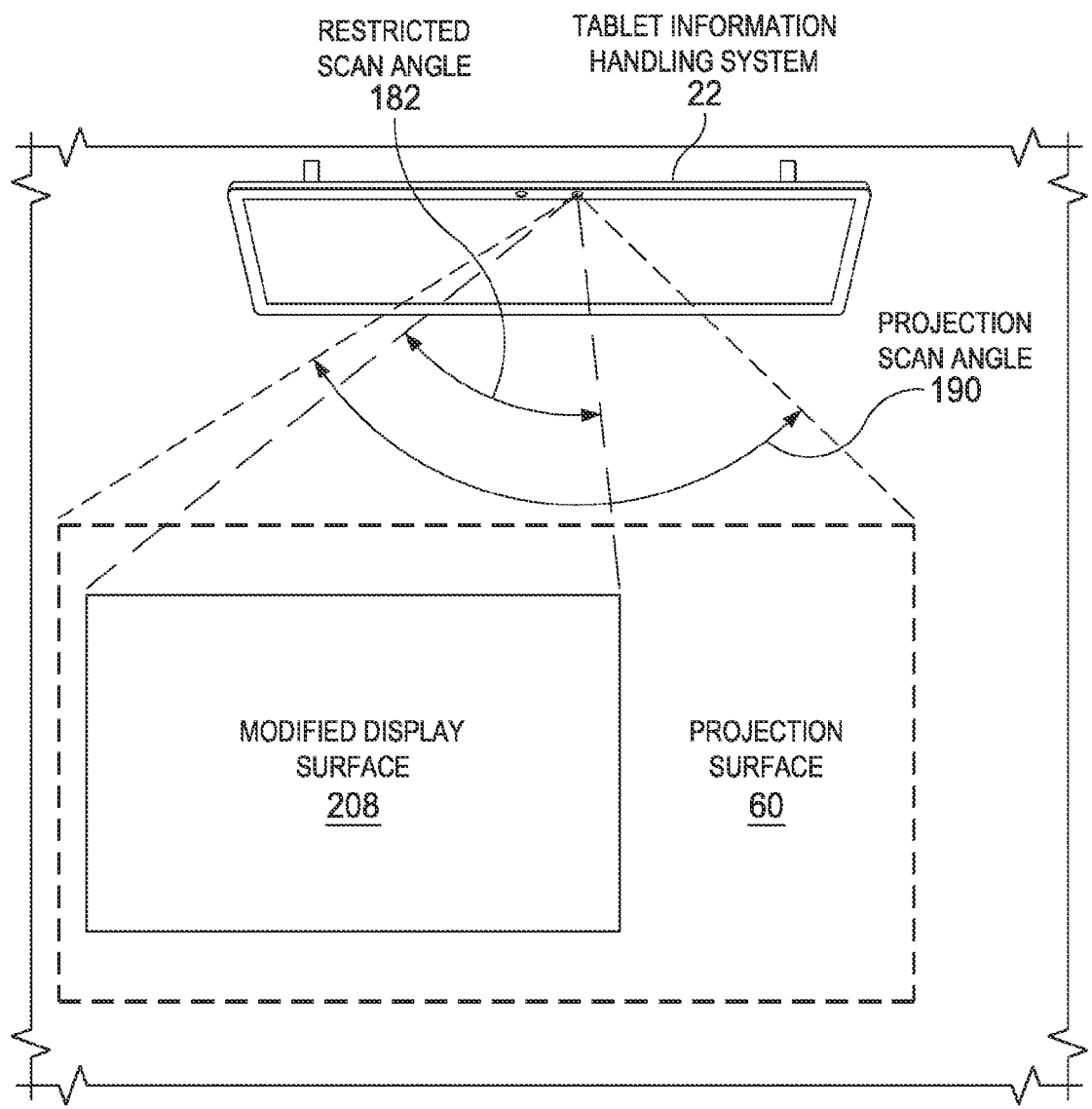
FIG. 22 depicts an example embodiment of adjusted scan angles to adapt a projected display aspect ratio.

Referring now to FIG. 22, an example embodiment depicts adjusted scan angles to adapt a projected display aspect ratio. An end user indicates a request to adjust the display aspect ratio with a gesture or menu input. In response, tablet information handling system 22 projects an outline of the projection surface 60 available with a total scan angle 190. The end user then indicates a desired display area by gesturing within the indicated projection surface 60 a boundary for a modified display surface 208. For instance, the user manually drags fingers to identify the size of the modified display surface 208 and then slides the modified display surface 208 to a desired location within projection surface 60. The end user indicates completion of the display modification with an appropriate gesture, such as a finger tap, and then tablet information handling system 22 automatically picks the closest standard aspect ratio and snaps to that size. Advantageously, tablet information handling system 22 scans substantially only the active portion of a display by adjusting the scan of the projector light source to the content presented by the display.

Figure 23:
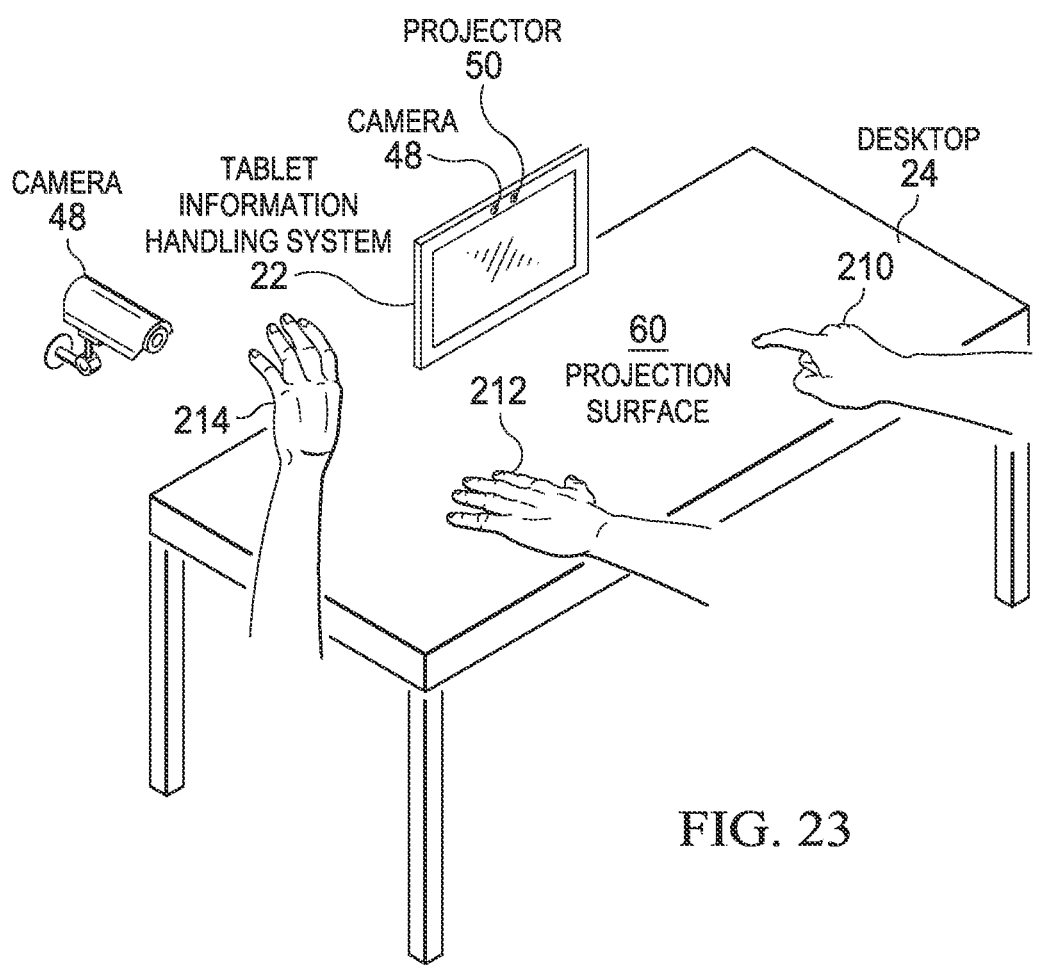
FIG. 23 depicts an example embodiment that demonstrates the use of distal upper extremity hand anthropometry as a factor in adapting projected I/O content.

Referring now to FIG. 23, an example embodiment demonstrates the use of distal upper extremity hand anthropometry as a factor in adapting projected I/O content. A desktop 24 provides a projection surface 60 that a projector 50 uses to project input and output devices, such as a keyboard, touchpad and display. In the example embodiment, three end user hand positions are depicted, a hand 210 having a finger pointing at projection surface 60, such as might be used on a projected touch pad; a hand 212 having fingers spread across projection surface 60, such as might be used on a projected keyboard; and a hand 214 raised over projection surface 60, such as might be used for gesture out of the plane of projection surface 60. During inputs by an end user made with finger motions at projection surface 60, one or more input sensors 48 detect a finger motion relative to a projected device to determine an input at the projected device. For instance, hand 210 points a finger to move a cursor with a projected touchpad, and hand 212 moves fingers to select keys of a projected keyboard. Raised hand 214 may also use finger motion to indicate gestures, such as by pointing to an object to invoke an application or moving a pointed finger to indicate an action, like writing or erasing content.

In addition to sensing digit motion of a hand to determine inputs at a projected device, tablet information handling system 22 senses distal upper extremity hand anthropometry as a factor in determining projected input and output device content. As an example, the position of a wrist relative to a hand and fingers indicates whether an end user is standing or sitting. If the end user is sitting, extending one hand 212 with fingers extended may be interpreted as a request for a projected keyboard. If, in contrast, the end user is standing, extending one hand with fingers extended may be interpreted as a request for a projected touchscreen display so that the end user may power down the information handling system. Analysis of upper hand position, such as wrist or arm positions, may be applied in combination with other indicators to adjust projected device presentation. For instance, hand 210 may be disregarded even though a finger is pointing if other hand or body positions contradict a request for a touchpad. For instance, an end user who taps his finger to music while reading a book will not be presented with a touch pad if the end user's other hand is waving in a raised position 214 to turn a page of a book. As another example, an end user who is leaning on desktop 24 and has his head looking away from projection surface 60 will not invoke presentation of a projected device since the combined analysis of the finger, hand and body positions do not indicate a desire to make inputs at projection surface 60.

Intelligent detection of human features, such as finger, arm, head and eye positions, and desktop environment features, such as objects and logos, allow automated management of projected input and output devices that improve an end user's experience and efficiency in interactions with one or more information handling systems. For instance, responses to objects detected by input sensors may be predetermined based on identification of specific objects or learned based upon end user actions, end user learning instructions, or access to a database of objects that relate objects with response or applications. In one embodiment a database is accessed that relates objects to responses, while in an alternative embodiment a general collection of images and data, like the Internet, is searched for "clues" and the proper response is "guessed" and provided for response by an end user. For instance, a VISA credit card, image is matched to that of credit card pictures online, and the VISA logo helps narrow down which website should be presented to the user for account information. For example, a flat plastic card may be predetermined as associated with a purchase application, while recognition of a VISA logo may result in a search for appropriate account information. Discovered objects may include smart objects that interact with an information handling system and projected input and output devices, as well as dumb objects associated with likely end user inputs, such as credit cards, car keys, reading glasses and a coffee mug. Further, projected input and output devices may provide gesture interaction support based upon detected objects. For example, detection of arm motion to place glasses on a desktop may be interpreted as a gesture to increase the font size of projected or displayed output devices. As another example, picking up glasses from a desktop results in automatically projecting a display having news items. Other examples including: projecting pictures stored on a camera if a user touches the camera, playing music if a user touches a speaker or a totem assigned a volume function, and changing music volume if a user gestures a rotation around the totem assigned the volume function. In the example of the phone presenting pictures, other phone functions may be identified by touching other physical aspects of the phone. For instance, a phone has both a camera and speakers so that multiple responses, such as presentation of photo or music information may be based upon how the user interacts with physical aspects of the phone. The response can be trained or "learned" by searching an online database and detecting that one feature of the phone is the camera lens and another is the speaker on the phone. The input sensor can ask the user what actions to assign to different parts of the phone simply by detecting salient features of the phone that may represent controls. In some embodiments, projected input and output devices directly interface with physical objects, such as projection of an infrared keyboard over a physical keyboard so that end user inputs at the keyboard are detected by a depth camera rather than sent from the keyboard.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
processing components disposed in the housing and operable to cooperate to process information;
a projector interfaced with the processing components and operable to present the information as images at a projection surface, the images including at least one input device;
an input sensor operable to detect end user hand movements proximate the projection surface, the input sensor including at least a camera operable to capture an image of the end user hand; and
a gesture module stored in non-transitory memory and interfaced with the projector and the input sensor, the gesture module operable to adapt a projected input device position on the projection surface in response to an end user hand movement detected by the input sensor;
wherein the gesture module is further operable to determine a unique feature of the end user hand associated with an identification of the end user and in response to the identification to present a user interface associated with the end user.

2. The information handling system of claim 1 wherein the end user movement comprises placement of fingers in a typing position and the input device comprises a keyboard having keys aligned to the placement of fingers.

3. The information handling system of claim 2 wherein the gesture module is further operable to detect an identification feature associated with the end user hand movement and, in response to the identification feature, to generate plural output devices associated with the identification feature including at least output devices previously used by the end user.

4. The information handling system of claim 3 wherein the plural output devices comprise projected content access devices, each projected content access device selectable by an end user touch to open content associated with the end user.

5. The information handling system of claim 1 wherein the end user movement comprises pressing down on a projected touchpad and sliding the touchpad from a first position on the projection surface to a second position on the projection surface.

6. The information handling system of claim 1 wherein the processing components comprise a display integrated in the housing and operable to present information as visual images, and the projected input device comprises a keyboard having an integrated display window, the integrated display window presenting key inputs made by an end user at the keyboard, the key inputs applied to visual images presented at a display.

7. The information handling system of claim 1 wherein the input sensor is further operable to detect end user hand movements in a plane out of alignment with the projection surface and the gesture module is further operable to apply the detected end user hand movements to the projected input device translated to the projection surface plane.

8. The information handling system of claim 1 wherein the projected input device comprises a projected keyboard and the gesture module adapts the projected keyboard to a selected of plural languages in response to an end user gesture.

* * * * *